United States Patent Office 3,209,000
Patented Sept. 28, 1965

3,209,000
DERIVATIVES OF 3β-HYDROXY STEROIDS AND THE 6- AND 16-SUBSTITUTED ANALOGS THEREOF
John C. Babcock and J Allan Campbell, Kalamazoo, Mich., assignors to The Upjohn Company, Kalamazoo, Mich., a corporation of Delaware
No Drawing. Filed May 1, 1963, Ser. No. 277,089
21 Claims. (Cl. 260—239.5)

This invention relates to novel steroids and more particularly to the derivatives of 3β-hydroxy steroids and methods used in the preparation thereof.

Some of the novel compounds of this invention can be represented by
(a) Those having the formulae

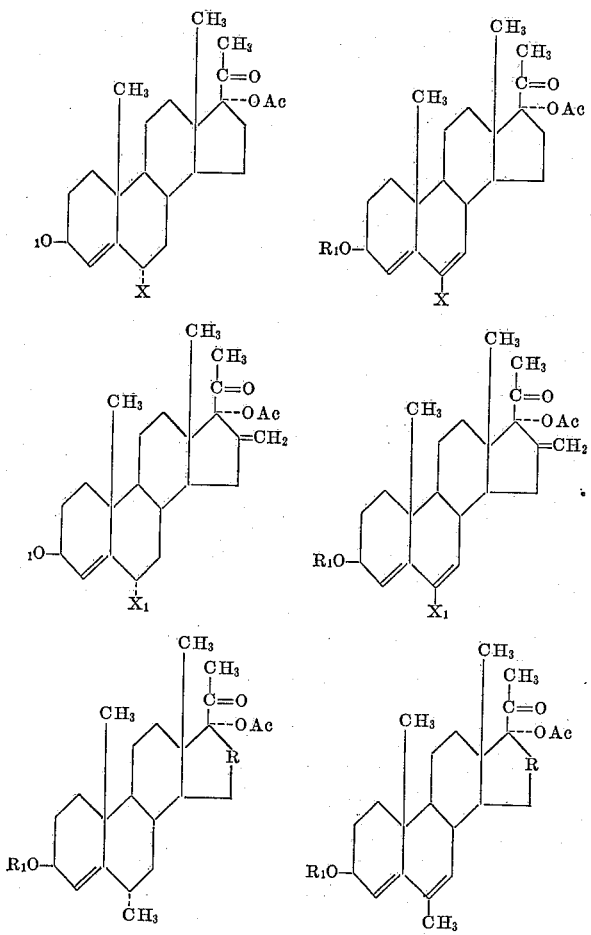

wherein Ac is the acetyl radical, X is selected from the group consisting of hydrogen, methyl, fluoro, chloro, trifluoromethyl, difluoromethyl, and fluoromethyl, $X_1$ is selected from the group consisting of hydrogen and methyl, R is selected from the group consisting of

and

and $R_1$ is selected from the group consisting of
(i) The acyl radical of a dibasic organic carboxylic acid, particularly a hydrocarbon dicarboxylic acid, containing from 3 to 12 carbon atoms, inclusive,
(ii) An aminoacyl radical of an amine substituted hydrocarbon carboxylic acid, such as an aminosubstituted acetyl radical of the formula

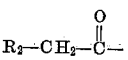

wherein $R_2$ is selected from the group consisting of the pyrrolidino, piperidino and morpholino radicals and a radical of the formula

wherein $R_3$ and $R_4$ are selected from the group consisting of the benzyl radical and lower alkyl radicals containing from 1 to 4 carbon atoms, inclusive;
(b) The alkali metal salts of (a)(i); and
(c) The pharmacologically acceptable acid addition and quaternary ammonium salts of (a)(ii).

The compounds of (a), (b) and (c) above are effective antifertility, estrus regulating, progestational, and pregnancy maintaining agents of improved therapeutic ratio and are particularly useful in the treatment of mammals. The compounds above are also useful in the treatment of inflammatory conditions of mammals and birds and are particularly useful in the treatment of inflammatory conditions of the skin, eyes and ears of humans and of valuable domestic animals, as well as contact dermatitis, anaphylaxis, and other allergic reactions.

Administration of the novel steroids of this invention can be in conventional dosage forms, such as pills, tablets, capsules, syrups or elixirs for oral use, or in liquid forms which are adaptable to the natural and synthetic cortical hormones for injectable products; they can also be administered topically in the form of ointments, creams, lotions, and the like, with or without coating antibiotics, germicides or other materials forming advantageous combinations therewith.

In addition, the compounds of (a), (b) and (c), particularly the compounds of (b) and (c), can be dissolved to a useful extent in aqueous vehicles to provide soluble formulations which are useful for intravenous and intraamniotic administration in treating habitual or threatened abortion. These aqueous solutions are also useful for oral administration (and may be formed in situ by injection of the water-soluble drug in the solid state) since they provide essentially improved efficacy and potency, rapid onset of activity, and a prolonged effect.

The novel steroids of this invention are prepared according to the following flow sheet:

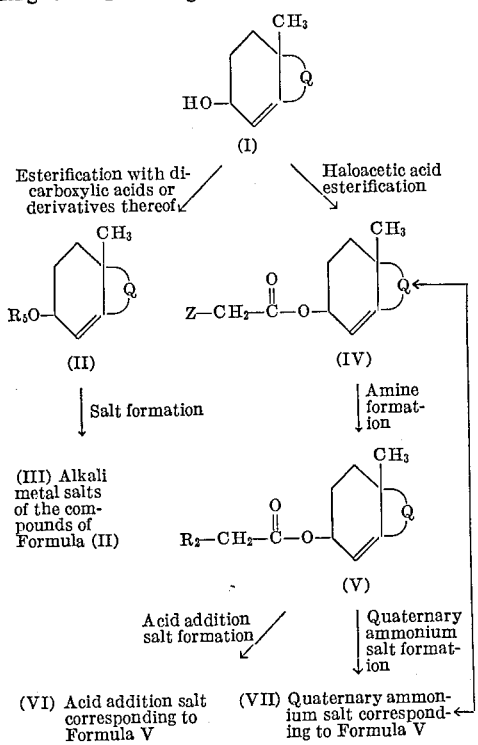

wherein Q is the remainder of the steroid moiety having B-, C- and D-ring configurations selected from the group consisting of

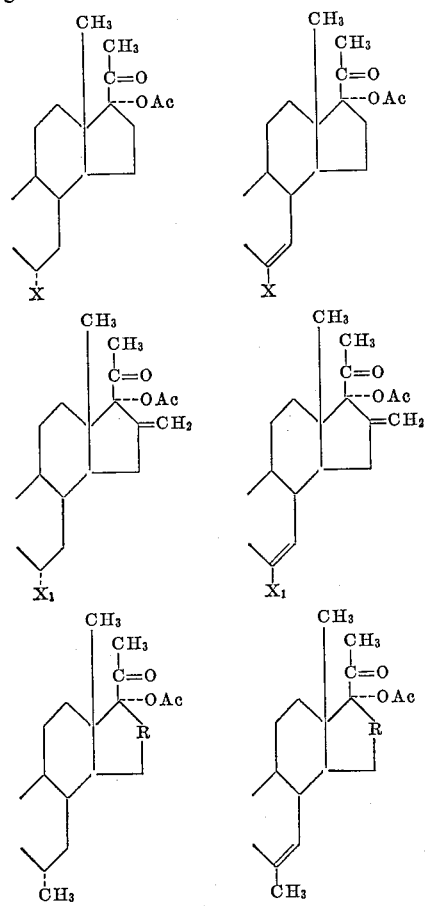

in which Ac, X, X₁ and R are defined as above, R₂ is defined as above, R₅ is the acyl radical of a hydrocarbon dicarboxylic acid containing from 3 to 12 carbon atoms, inclusive, and Z is selected from the group consisting of chlorine and bromine.

It is to be understood that the discussion which follows is not to be construed as being limited to the specific compounds named but is applicable to, and embracive of, all the compounds disclosed within the purview of the flow sheet.

The novel compounds of the present invention are prepared by the following reactions:

ESTERIFICATION WITH HYDROCARBON DICARBOXYLIC ACIDS OR DERIVATIVES THEREOF
(I)→(II)

The compounds of Formula I can be converted to their 3β-acylates, the compounds of Formula II, by methods known in the art. This is accomplished by allowing the compounds of Formula I, such as 3β,17α-dihydroxy-4-pregnen-20-one 17-acetate, to react with an acylating agent thus yielding the compounds of Formula II, such as 3β,17α-dihydroxy-4-pregnen-20-one 3-acylate 17-acetate.

Suitable acylating agents are dibasic organic carboxylic acids, particularly hydrocarbon dicarboxylic acids, containing from 3 to 12 carbon atoms, inclusive, or the anhydrides or acid halides thereof. For example, a saturated dibasic acid, e.g., malonic succinic, glutaric, adipic, pimelic, suberic, α,β-dimethylsuccinic, α,β-diethylsuccinic, β-methylglutaric, α,β-dimethylglutaric, α,α-diethylglutaric, β,β-dimethylglutaric, α-ethyl-β-methylglutaric, β-ethyl-β-methylglutaric, α,α,β-trimethylglutaric, α,β,β-trimethylglutaric, α,β,γ-trimethylglutaric, α-ethyl-β,β-dimethylglutaric, α,α,β,β-tetramethylglutaric, α,β,β,γ-tetramethylglutaric, β-methyl-β-butylglutaric, β-methyl-β-isobutylglutaric, α-methyladipic, α,α-dimethyladipic, and the like; dibasic unsaturated acids, e.g., maleic, citraconic; o-, m-, p-phthalic acid; diglycolic acid, and the like; or the acid anhydrides and acid halides thereof, can be used to acylate the compounds of Formula I to convert them into the compounds of Formula II.

The conversion of the compounds of Formula I to the compounds of Formula II is carried out using the acylating agent as solvent, or preferably in the presence of a suitable inert solvent, such as benzene, xylene, dioxane, methylene chloride, ether, and the like, particularly when the acylating agent is a solid, and frequently in the presence of a catalyst, such as p-toluenesulfonic acid, or an amine, preferably pyridine. Completion of the reaction can take from a few minutes to 24 hours, depending on the temperature and the solvent employed. If the acylating agent is the free acid, the reaction is preferably carried out in the presence of an esterification catalyst, for example, p-toluenesulfonyl chloride, trifluoroacetic anhydride, p-toluenesulfonic acid, trifluoroacetic acid, sulfuric acid, and the like.

The thus obtained compounds of Formula II are recovered from the reaction mixture by conventional methods, such as, for example, precipitation by dilution with water or dilute inorganic acid and collection of the 3-acylated reaction production, such as 3β,17α-dihydroxy-4-pregnen-20-one 3-hemisuccinate 17-acetate, by filtration or extraction with a water-immiscible solvent such as methylene chloride, ethyl acetate, benzene, ether, and the like, direct crystallization, chromatography, counter-current extraction or a combination of these, followed by final crystallization if desired.

The 3-acylate 17-acetate steroids of Formula II can, if desired, be used in the salt formation step in the crude state.

SALT FORMATION (II)→(III)

The compounds of Formula II, such as, for example, 3β,17α-dihydroxy-4-pregnen-20-one 3-hemisuccinate 17-acetate, are converted to water-soluble salts, the alkali metal salts, i.e., sodium, potassium or lithium salts, the compounds designated III, such as 3β,17α-dihydroxy-4- pregnen-20-one 3-sodium succinate 17-acetate, according to procedures well known in the art for the preparation of water-soluble salts, e.g., the preparation of water soluble-salts of hydrocortisone hemiacylates from hydrocortisone 21-hemiacylates, disclosed in U.S. Patent 3,025,311.

HALOACETIC ACID ESTERIFICATION (I)→(IV)

Reaction of the compounds of Formula I, such as, for example, 3β,17α-dihydroxy-4-pregnen-20-one 17-acetate, with bromoacetic anhydride (or bromoacetyl chloride) or chloroacetic anhydride (or chloroacetyl chloride) gives the corresponding 3-bromoacetate or 3-chloroacetate ester respectively of the compounds of Formula IV, such as, for example, 3β,17α-dihydroxy-4-pregnen-20-one 3-bromoacetate 17-acetate or 3β-17α-dihydroxy-4-pregnen-20-one 3-chloroacetate 17-acetate.

The 3-haloacetic esterification is preferably carried out using a solution of the haloacetic anhydride in an inert solvent, such as ether, tetrahydrofuran, methylene, chloride, benzene, and the like, preferably in the presence of pyridine as catalyst, as known in the art. The reaction is carried out at temperatures from about 0° to 60° C., with temperatures of from about 0° to 30° C. being preferred. Preferably the reaction is also carried out under an inert atmosphere, e.g., nitrogen.

The thus obtained compounds of Formula IV are recovered from the reaction mixture and purified by conventional methods, such as, for example, those described above for the recovery and purification of the compounds of Formula II. However, the compounds of Formula IV need not be purified to a high degree since the crude reaction product containing them can be used directly in the next succeeding step, the amine formation.

AMINE FORMATION (IV)→(V)

The compounds of Formula IV, such as, for example, 3β,17α-dihydroxy-4-pregnen-20-one 3-bromoacetate 17-acetate or 3β,17α-dihydroxy-4-pregnen-20-one 3-chloroacetate 17-acetate, are reacted with more than one equivalent, and preferably with at least two equivalents, of the selected secondary amine to yield the corresponding 3-aminoacetate esters, the compounds of Formula V, such as, for example, 3β,17α-dihydroxy-4-pregnen-20-one 3-dimethylaminoacetate 17-acetate, according to procedures known in the art.

Suitable secondary amines are, for example, dimethylamine, diethylamine, dipropylamine, dioctylamine, methylethylamine, methylpropylamine, dibenzylamine, methylbenzylamine, pyrrolidine, piperidine, morpholine, and the like.

The reaction is carried out in an inert solvent, e.g., benzene, toluene, ether, dioxane, tetrahydrofuran, commercial hexanes, carbon tetrachloride, methylene chloride, 2-butanone, and the like, at temperatures from about 10° C. to the reflux temperature of the reaction mixture, with 20° to 60° C. being preferred, for a period of from 1 to 48 hours. The reaction mixture is filtered and the compounds of Formula V, such as, for example, 3β,17α-dihydroxy-4-pregnen-20-one 3-dimethylaminoacetate 17-acetate, are recovered from the filtrate and purified by conventional methods, such as, for example, those described above for the recovery and purification of the compounds of Formula II. However, the compounds of Formula V need not be purified to a high degree since they can be used in the following steps, the acid addition or quaternary ammonium salt formation, in the crude state.

ACID ADDITION SALT FORMATION (V)→(VI)

The compounds of Formula V, such as, for example, 3β,17α-dihydroxy-4-pregnen-20-one 3-dimethylaminoacetate 17-acetate, are reacted with a pharmacologically acceptable acid, such as, for example, formic, acetic, propionic, hydrochloric, hydrobromic, hydriodic, sulfuric, phosphoric, nitric, lactic, pamoic, and the like, to produce the acid addition salts of the compounds of Formula V, the compounds designated VI, such as, for example, 3β, 17α-dihydroxy-4-pregnen-20-one 3-dimethylaminoacetate 17-acetate hydrochloride.

The 3-aminoacetate ester is treated in an inert solvent with the appropriate acid and recovered under conditions well known in the art for the preparation and recovery of amine acid addition salts.

In a preferred procedure a solution containing a slight excess of pharmacologically acceptable acid in an inert solvent, such as, for example, ether, 2-butanone, dioxane, tetrahydrofuran, and the like, is added slowly to a well stirred solution of the 3-aminoacetate ester. The acid addition salt precipitates and is collected by filtration. If desired, the thus produced acid addition salt can be further purified by recrystallization.

QUATERNARY AMMONIUM SALT FORMATION (V)→(VII)

The compounds of Formula V, such as, for example, 3β,17α-dihydroxy-4-pregnen-20-one 3-dimethylaminoacetate 17-acetate, are reacted with a lower-alkyl halide, such as, for example, a lower-alkyl bromide, iodide or chloride, preferably methyl or ethyl bromide, and the like, to produce the quaternary ammonium compounds of Formula V, designated as VII, such as, for example, 3β,17α-dihydroxy-4-pregnen-20-one 3-dimethylaminoacetate 17-acetate methobromide.

The 3-aminoacetate ester is treated with the appropriate lower-alkyl halide and recovered, under conditions well known in the art for the preparation and recovery of quaternary ammonium salts.

In a preferred procedure a solution of the alkyl halide in ether is added to a solution of the 3-aminoacetate ester in an inert solvent, such as, for example, benzene, ether, dioxane, 2-butanone, and the like, and stirred at a temperature of from about 10° to 80° C. for about 1 to 120 hours. The quaternary ammonium salt which precipitates is collected by filtration and, if desired, purified by recrystallization.

DIRECT QUATERNARY AMMONIUM HALIDE FORMATION (IV)→(VII)

Alternatively, the compounds of Formula IV, such as, for example, 3β,17α-dihydroxy-4-pregnen-20-one 3-bromoacetate 17-acetate or 3β,17α-dihydroxy-4-pregnen-20-one 3-chloroacetate 17-acetate, are reacted with one or more equivalents of a tertiary amine, such as, for example, trimethylamine, triethylamine, tripropylamine, dimethylethylamine, benzyldimethylamine, pyridine, and the like, to yield the corresponding 3-aminoacetate quaternary ammonium halides, the compounds embraced by designation VII, such as, for example, 3β,17α-dihydroxy-4-pregnen-20-one 3-dimethylaminoacetate 17-acetate methobromide or 3β,17α-dihydroxy-4-pregnen-20-one 3-dimethylaminoacetate 17-acetate methochloride.

The reaction is carried out in an inert solvent, such as, for example, benzene, toluene, ether, dioxane, tetrahydrofuran, commercial hexanes, carbon tetrachloride, methylene chloride, 2-butanone, and the like, at temperatures of from about 0° to 100° C., preferably at about 20° to 60° C., for 1 to 48 hours. The 3-aminoacetate quaternary ammonium halide which precipitates is collected by filtration and, if desired, purified by recrystallization.

The following preparations and examples illustrate the best mode contemplated by the inventors for carrying out their invention, but are not to be construed as limiting.

PREPARATION 1

*6α-difluoromethyl-17α-hydroxy-4-pregnene-3,20-dione 17-acetate*

A. 6α-HYDROXYMETHYL-3β,17α-DIHYDROXY-5α-PREGNAN-20-ONE 3,17-DIACETATE

A mixture of 125 g. of the known compound 3β,17α-dihydroxy-5-pregnen-20-one 3,17-diacetate, 1875 ml. of toluene and 18.75 g. of cobalt carbonate catalyst was placed in a 1 gallon stainless steel autoclave equipped with a mechanical stirrer. The vessel was flushed three times with carbon monoxide and the pressure therein brought to 450 p.s.i. with carbon monoxide, then to 1150 p.s.i. with hydrogen and heated at 180° C. for a period of about 18 hours. The reaction mixture was cooled and filtered through a bed of Celite (diatomaceous earth) and the clear yellow filtrate concentrated to dryness on a rotary evaporator. The residue was triturated with a mixture of ethyl acetate and ether and the crystals collected and washed with ether to yield 71.2 g. of product with a melting point of 225 to 231° C. An additional 4.6 g. was obtained from the mother liquor. A portion of the product was recrystallized from ethyl acetate to yield an analytical sample of 6α-hydroxymethyl-3β,17α-dihydroxy-5α-pregnan-20-one 3,17-diacetate having a melting point of 232 to 234° C. and a rotation $[\alpha]_D$ of $-1°$ (chloroform).

Analysis.—Calcd. for $C_{26}H_{40}O_6$: C, 69.01; H, 8.99. Found: C, 69.64; H, 8.72.

B. 6α-p-TOLUENESULFONOXYMETHYL-3β,17α-DIHYDROXY-5α-PREGNAN-20-ONE 3,17-DIACETATE 14.3 g. of p-toluenesulfonyl chloride was added to a solution of 14.3 g. of 6α-hydroxymethyl-3β,17α-dihydroxy-5α-pregnan-20-one 3,17-diacetate in 100 ml. of pyridine. The solution was kept in a cold bath for a few minutes, then at room temperature for a period of about 18 hours. The solution was then poured into dilute sodium bicarbonate solution and the resulting precipitate collected on a filter, thoroughly washed with water and dried to yield 17.8 g. of product having a melting point of 197 to 208° C. Two recrystallizations from ethyl acetate gave an analytical sample of 6α-p-toluenesulfonoxymethyl-3β,17α-dihydroxy-5α-pregnan-20-one 3,17-diacetate, melting at 214 to 216° C. with rotation $[\alpha]_D$ (chloroform) of $+1°$.

Analysis.—Calcd. for $C_{33}H_{44}O_8S$: C, 65.28; H, 7.53; S, 5.45. Found: C, 65.82; H, 7.82; S, 5.23.

C. 6α-FORMYL-3β,17α-DIHYDROXY-5α-PREGNAN-20-ONE 3,17-DIACETATE

A suspension of 20 g. of sodium bicarbonate in 125 ml. of dimethylsulfoxide with nitrogen bubbling therethrough was heated in an oil bath held at a temperature of about 155° C. When the temperature of the suspension reached 135° C., 12.3 g. of 6α-p-toluenesulfonoxymethyl-3β,17α-dihydroxy-5α-pregnan-20-one 3,17-diacetate was added thereto. The flask containing the suspension was swirled intermittently for a period of about 10 minutes. The reaction mixture was cooled to about 40° C., then poured into ice-water. The amorphous precipitate was collected, washed with water and dried to yield 9.05 g. of product. A 1 g. aliquot of this material was chromatographed through a 100 g. Florisil (synthetic magnesium silicate) column using gradient elution, employing 3 l. of a mixture of Skellysolve B (hexane hydrocarbons) containing 4% acetone and 3 l. of a mixture of Skellysolve B containing 12% of acetone and collecting 250 ml. fractions to yield the desired aldehyde (fractions 13 to 17). The product obtained from these eluates was recrystallized twice from ether to give 0.2 g. of dense crystals of 6α-formyl-3β,17α-dihydroxy-5α-pregnan-20-one 3,17-diacetate with a melting point of 170 to 172° C. (decomposition) and rotation $[\alpha]_D$ (chloroform) of $+28°$.

Analysis.—Calcd. for $C_{26}H_{38}O_6$: C, 69.92; H, 8.58. Found: C, 70.01; H, 8.70.

D. 6α-DIFLUOROMETHYL-3β,17α-DIHYDROXY-5α-PREGNAN-20-ONE 3,17-DIACETATE 2 g. of unpurified 6α-formyl-3β,17α-dihydroxy-5α-pregnan-20-one 3,17-diacetate in 20 ml. of methylene chloride and 0.2 ml. of water was treated with 40 g. of sulfur tetrafluoride in a stainless steel rocking autoclave at room temperature for a period of about 16 hours. The reaction mixture was washed with sodium bicarbonate solution and water, dried and the solvent removed. The residue was dissolved in methylene chloride and chromatographed through a 175 g. Florisil column packed wet with Skellysolve B and eluted by gradient elution with 4 l. of a mixture of 3% acetone in Skellysolve B and 4 l. of a mixture of 12% acetone in Skellysolve B taking 250 ml. fractions. The desired difluoromethyl compound was eluted in fractions 14 to 21. The residues of these fractions were combined and recrystallized from a mixture of acetone and Skellysolve B to yield 1.15 g. of this material. Recrystallization from the same solvents gave pure light-colored 6α-difluoromethyl-3β,17α-dihydroxy-5α-pregnan-20-one 3,17-diacetate melting at 154 to 156° C.

Analysis.—Calcd. for $C_{26}H_{38}F_2O_5$: C, 66.64; H, 8.17. Found: C, 67.04; H, 8.17.

E. 6α-DIFLUOROMETHYL-3β,17α-DIHYDROXY-5α-PREGNAN-20-ONE 17-ACETATE

A solution of 1.9 g. of 6α-difluoromethyl-3β,17α-dihydroxy-5α-pregnan-20-one 3,17-diacetate was heated at refluxing temperature with 40 ml. of methanol and 0.4 ml. of concentrated hydrochloric acid for a period of about 1 hour. Water was added and most of the methanol evaporated with a fast stream of nitrogen. The resulting precipitate was collected by filtration, washed with water and dried to yield 1.6 g. of product. A small amount of this material was recrystallized from a mixture of acetone and Skellysolve B to yield 6α-difluoromethyl-3β,17α-dihydroxy-5α-pregnan-20-one 17-acetate with a melting point of 197 to 205° C. and a rotation $[\alpha]_D$ (chloroform) of $+12°$.

Analysis.—Calcd. for $C_{24}H_{36}F_2O_4$: C, 67.57; H, 8.51. Found: C, 67.54; H, 8.61.

F. 6α-DIFLUOROMETHYL-17α-HYDROXY-5α-PREGNANE-3,20-DIONE 17-ACETATE 0.9 g. of 6α-difluoromethyl-3β,17α-dihydroxy-5α-pregnan-20-one 17-acetate was added to a solution of 0.9 g. of sodium dichromate dihydrate in 9 ml. of acetic acid. The solution was stirred for a period of about 5 hours and poured into water. The resulting precipitate was collected by filtration, washed with water and dried. It was chromatographed through a 75 g. column of Florisil previously packed wet with Skellysolve B; gradient elution of the product was carried out with mixtures of 3 l. of 2% acetone in Skellysolve B and 3 l. of 12% acetone in Skellysolve B taking 250 ml. fractions. Fractions 22 to 27 gave 0.6 g. of the 3-ketone melting at 188 to 192° C. after recrystallization from acetone. A small portion of this material was again recrystallized from acetone to yield pure light-colored 6α-difluoromethyl-17α-hydroxy-5α-pregnane-3,20-dione 17-acetate having a melting point of 192 to 193° C. and a rotation $[\alpha]_D$ (chloroform) of $+17°$.

Analysis.—Calcd. for $C_{24}H_{34}F_2O_4$: C, 67.90; H, 8.07. Found: C, 68.10; H, 8.34.

G. 6α-DIFLUOROMETHYL-17α-HYDROXY-4-PREGNENE-3,20-DIONE 17-ACETATE 410 mg. of 6α-difluoromethyl-17α-hydroxy-5α-pregnane-3,20-dione 17-acetate in 10 ml. of dioxane was acidified with a drop of 4 N hydrogen bromide in dioxane and 320 mg. of bromine added over a period of 1 minute. After a period of about 1 hour at room temperature, an excess of aqueous sodium bicarbonate solution was added to the reaction mixture. The precipitated 2,4-dibromo derivative of 6α-difluoromethyl-17α-hydroxy-5α-pregnan-3,20-dione 17-acetate was treated with 0.9 g. of sodium iodide in 15 ml. of acetone containing bromoacetone, and the mixture heated at refluxing temperature for a period of about 2.5 hours. 0.3 g. of oxalic acid was then added and heating continued for a period of about 1 hour. After cooling, ethyl acetate was added and the solution filtered. The filtrate was washed with water and sodium bicarbonate solution, then dried with sodium sulfate. The filtrate was stirred with 500 mg. of zinc dust in 2 ml. of acetic acid for about 1 hour and then filtered. The organic layer was washed successively with water, sodium bicarbonate solution and dried with sodium sulfate. Evaporation of the solvent gave the crude α,β-unsaturated ketone, which on purification with a Girard reagent, followed by subsequent crystallization yielded pure light-colored 6α - difluoromethyl-17α-hydroxy-4-pregnene-3,20-dione 17-acetate.

Alternatively, if desired, the crude α,β-unsaturated ketone can be purified by chromatography over Florisil with increasing proportions of acetone in Skellysolve B, followed by recrystallization.

H. 6α-DIFLUOROMETHYL-17α-HYDROXY-4-PREGNENE-3,20-DIONE 17-ACETATE

A medium consisting of 1% dextrose hydrate, 2% cornsteep liquor of 60% solids and tap water was adjusted to pH 4.9 with sodium hydroxide. The medium was steam sterilized at 15 pounds pressure for about 30 minutes, cooled and then inoculated with a 24 hour growth, from spores, of *Nocardia blackwellii* (NCTC 630 [Medical Research Council of the Lister Institute, London]). The medium was agitated and sparged with sterile air at the rate of one-tenth volume of air per volume of medium per minute. At the end of 24 hours of fermentation at room temperature, the pH was about 7.4. To this culture there was added a solution of 6α-difluoromethyl-17α-hydroxy-5α-pregnane-3,20-dione 17-acetate dissolved in a minimal amount of dimethylformamide. The solution was prepared by dissolving 5 parts of the steroid in 100 parts of the solvent and adding about 10 ml. of the solution per liter of the medium. Fermentation was continued for a period of about 6 hours whereupon the mycelium and beer were extracted thoroughly with methylene chloride. The extract was washed with sodium bicarbonate solution and then with water, dried and concentrated under vacuum to give 6α-difluoromethyl-17α-hydroxy-4-pregnene-3,20 dione.

Instead of *Nocardia blackwellii* (NCTC 630 [Medical Research Council of the Lister Institute, London]) to produce fermentative dehydrogenation at the 4,5 position, other microorganisms may be similarly effectively employed; included are those chosen from the group consisting of: ATCC 4275 (*Nocardia convoluta*); ATCC 9604 (*Norcardia gardneri*) and NRRL B-1365 (*Nocardia coeliaca*).

A solution composed of 1 g. of 6α-difluoromethyl-17α-hydroxy-4-pregnene-3,20-dione, 2.5 ml. of distilled acetic anhydride, 250 mg. of p-toluenesulfonic acid and 2.5 ml. of acetic acid was stirred for a period of about 90 minutes. The mixture was poured with vigorous stirring into water. The precipitated solid was separated by filtration, dried, chromatographed over Florisil with increasing proportions of acetone in Skellysolve B and recrystallized from ethyl acetate to yield light-colored 6α-difluoromethyl-17α-hydroxy-4-pregnene-3,20-dione 17-acetate.

PREPARATION 2

*6-difluoromethyl-17α-hydroxy-4,6-pregnadiene-3,20-dione 17-acetate*

1 g. of 6α - difluoromethyl - 17α - hydroxy-4-pregnene-3,20-dione 17-acetate, 1.5 g. of recrystallized 2,3,5,6-tetrachloro-1,2-benzoquinone (chloranil) and 60 ml. of tertiary amyl alcohol were heated to boiling under nitrogen with a few boiling chips, and gently refluxed for a period of about 6 hours. The mixture was cooled and evaporated to dryness under reduced pressure. The solid residue (with the exception of some chloranil, which was insoluble) was dissolved in about 100 ml. of ether and filtered. The chloranil on the filter paper was washed with several portions of ether and the combined ether filtrates washed with 200 ml. portions of cold 2% sodium hydroxide. The ether filtrates were washed with cold water until the washings were neutral, then with saturated sodium chloride solution. The pooled ether solutions were dried over sodium sulfate and evaporated to dryness. This residue dissolved in methylene chloride was chromatographed over a 125 g. column of Florisil and eluted with fractions of Skellysolve B containing increasing proportions of acetone. The last third of the fractions were evaporated to dryness. The residue was recrystallized twice from cold methanol to yield pure light-colored crystalline 6-difluoromethyl - 17α - hydroxy-4,6-pregnadiene-3,20-dione 17-acetate.

PREPARATION 3

*6α-fluoromethyl-17α-hydroxy-4-pregnene-3,20-dione 17-acetate*

A. 6α-IODOMETHYL-3β,17α-DIHYDROXY-5α-PREGNAN-3-ONE 3,17-DIACETATE

A suspension of 15 g. of 6α-hydroxymethyl-3β,17α-dihydroxy-5α-pregnan-20-one 3,17-diacetate (see Preparation 1A) and 20 g. of triphenylphosphite methiodide in 30 ml. of methyl iodide was heated at refluxing temperature for a period of about 2 hours or about one hour longer than the formation of a clear solution. Most of the solvent was evaporated leaving a dark syrup. The syrup was diluted with a mixture of methylene chloride and ether and washed successively with water, dilute sodium thiosulfate, additional water and dried. The solvent was removed with a rotary evaporator to give a light-colored oil. Addition of methanol to the oil precipitated the product which was collected on a filter, washed with a small amount of methanol and dried to yield 12.3 g. of material melting at 202 to 204° C. An analytical sample was obtained by recrystallization of the product from a mixture of acetone and Skellysolve B (hexanes) to yield 6α - iodomethyl-3β,17α-dihydroxy-5α-pregnan-3-one 3,17-diacetate with a melting point of 201 to 205° C. and a rotation $[\alpha]_D$ of +28° (chloroform).

*Analysis.*—Calcd. for $C_{26}H_{39}O_5I$: C, 55.91; H, 7.04; I, 22.72. Found: C, 56.37; H, 7.04; I, 20.64.

B. 6α-FLUOROMETHYL-3β,17α-DIHYDROXY-5α-PREGNAN-20-ONE 3,17-DIACETATE

A solution of silver fluoride was prepared in a polyethylene bottle by condensing 26 g. of hydrogen fluoride, adding 200 ml. of acetonitrile and then adding an excess of silver oxide, filtering off the unreacted silver oxide and recovering the clear silver fluoride solution. 190 ml. of the thus prepared silver fluoride solution mixed with 12 g. of 6α-iodomethyl-3β, 17α-dihydroxy-5α-pregnan-3-one 3,17-diacetate was stirred at room temperature for a period of about one-half hour and then heated at refluxing temperature for a period of about 2 hours. Most of the solvent was evaporated off with a stream of nitrogen. The remaining concentrated material was diluted with water and extracted thoroughly with methylene chloride. The extracts were pooled, washed with water, dried and concentrated to dryness to give a crude partly crystalline product containing 6α-fluoromethyl-3β,17α-dihydroxy-5α-pregnan-20-one 3,17-diacetate which can, if desired, be separated by conventional means, e.g., by chromatography and crystallization.

C. 6α-FLUOROMETHYL-3β,17α-DIHYDROXY-5α-PREGNAN-20-ONE 17-ACETATE

About 9 g. of the crude partly crystalline product containing 6α-fluoromethyl-3β,17α-dihydroxy-5α-pregnan-20-one 3,17-diacetate (obtained in Preparation 3B) was dissolved in 200 ml. of methanol and 2 ml. of concentrated hydrochloric acid and refluxed for a period of about an hour under a stream of nitrogen. Part of the methanol was evaporated with nitrogen, and water added to cause precipitation. The precipitate was separated by filtration, washed with water and dried to yield 8 g. of a crude product containing 6α-fluoromethyl-3β,17α-dihydroxy-5α-pregnan-20-one 17-acetate which can, if desired, be purified by conventional means, e.g., by chromatography and crystallization.

D. 6α-FLUOROMETHYL-17α-HYDROXY-5α-PREGNANE-3,20-DIONE 17-ACETATE 8 g. of the crude product containing 6α-fluoromethyl-3β,17α-dihydroxy-5α-pregnan - 20 - one 17 - acetate (obtained in Preparation 3C) was added to a solution of 8 g. of sodium dichromate dihydrate in 70 ml. of acetic acid. After a period of about 5½ hours, the reaction mixture was poured into water and the resulting precipitate filtered, washed with water and sucked nearly dry. The precipitate was dissolved in methylene chloride and the organic phase separated and dried over magnesium sulfate. The methylene chloride solution was adsorbed on a column of 300 g. of Florisil (synthetic magnesium silicate) and the column extracted by gradient elution chromatography employing 4 l. of 4% acetone in Skellysolve B and 4 l. of 10% acetone in Skellysolve B.

6α-fluoromethyl-17α-hydroxy-5α-pregnane - 3,20-dione 17-acetate was eluted in fractions 23 to 29. These fractions were pooled and evaporated; the combined residues on recrystallization gave 2 g. of product with a melting point of 172 to 175° C. An analytical sample was obtained by recrystallization from a mixture of acetone and Skellysolve B, providing pure 6α-fluoromethyl-17α-hydroxy-5α-pregnane-3,20-dione 17-acetate with a melting point of 175 to 176° C.

Analysis.—Calcd. for $C_{24}H_{35}FO_4$: C, 70.90; H, 8.68; F, 4.67. Found: C, 71.08; H, 8.88; F, 4.59.

E. 6α-FLUOROMETHYL-17α-HYDROXY-4-PREGNENE-3,20-DIONE 17-ACETATE 410 mg. of 6α-fluoromethyl-17α-hydroxy-5α-pregnane-3,20-dione 17-acetate in 10 ml. of dioxane was acidified with a drop of 4 N hydrogen bromide in dioxane and 320 mg. of bromide added over a period of 1 minute. After a period of about 1 hour at room temperature, an excess of sodium bicarbonate solution was added to the reaction mixture. The precipitated 2,4-dibromo derivative of 6α-fluoromethyl-17α-hydroxy-5α-pregnan-3,20-dione 17-acetate was treated with 0.9 g. of sodium iodide in 15 ml. of acetone containing bromoacetone, and the mixture heated at refluxing temperature for a period of about 2.5 hours. 0.3 g. of oxalic acid was then added and heating continued for a period of about 1 hour. After cooling, ethyl acetate was added and the solution filtered. The filtrate was washed with water and sodium bicarbonate solution, then dried with sodium sulfate. The filtrate was stirred with 500 mg. of zinc dust in 2 ml. of acetic acid for about 1 hour and then filtered. The organic layer was washed successively with water, sodium bicarbonate solution and dried with sodium sulfate. Evaporation of the solvent gave the crude α,β-unsaturated ketone, which on purification with a Girard reagent, followed by subsequent crystallization yielded pure light colored 6α-fluoromethyl-17α-hydroxy-4-pregnene-3,20-dione 17-acetate. Alternatively, if desired, the crude α,β-unsaturated ketone can be purified by chromatography over Florisil with increasing proportions of acetone in Skelysolve B, followed by recrystallization.

F. 6α-FLUOROMETHYL-17α-HYDROXY-4-PREGNENE-3,20-DIONE 17-ACETATE

A medium consisting of 1% dextrose hydrate, 2% cornsteep liquor of 60% solids and tap water was adjusted to pH 4.9 with sodium hydroxide. The medium was steam sterilized at 15 pound pressure for about 30 minutes, cooled and then inoculated with a 24 hour growth, from spores, of Nocardia blackwellii (NCTC 630 [Medical Research Council of the Lister Institute, London]). The medium was agitated and sparged with sterile air at the rate of one-tenth volume of air per volume of medium per minute. At the end of 24 hours of fermentation at room temperature, the pH was about 7.4. To this culture, there was added a solution of 6α-fluoromethyl-17α-hydroxy-5α-pregnane - 3,20 - dione 17-acetate dissolved in a minimal amount of dimethylformamide. The solution was prepared by dissolving 5 parts of the steroid in 100 parts of the solvent and adding about 10 ml. of the solution per liter of the medium. Fermentation was continued for a period of about 6 hours whereupon the mycelium and beer were extracted thoroughly with methylene chloride. The extract was washed with sodium bicarbonate solution and then with water, dried and concentrated under vacuum to give 6α-fluoromethyl-17α-hydroxy-4-pregnene-3,20-dione.

Instead of Nocardia blackwellii (NCTC 630 [Medical Research Council of the Lister Institute, London]) used to produce fermentative dehydrogenation at the 4,5-position, other microorganisms may be similarly effectively employed; included are those chosen from the group consisting of: ATCC 4275 (Nocardia convoluta); ATCC 9604 (Nocardia gardneri) and NRRL B–1365 (Nocardia coeliaca).

A solution composed of 1 g. of 6α-fluoromethyl-17α-hydroxy-4-pregnene-3,20-dione 17-acetate, 2.5 ml. of distilled acetic anhydride, 250 mg. of p-toluenesulfonic acid and 2.5 ml. of acetic acid was stirred for a period of about 90 minutes. The mixture was poured with vigorous stirring into water. The precipitated solid was separated by filtration, dried, chromatographed over Florisil with increasing proportions of acetone in Skellysolve B and recrystallized from ethyl acetate to yield light-colored 6α-fluoromethyl - 17α - hydroxy-4-pregnene-3,20-dione 17-acetate.

PREPARATION 4

*6-fluoromethyl-17-hydroxy-4,6-pregnadiene-3,20-dione 17-acetate*

1 g. of 6α-fluoromethyl-17α-hydroxy-4-pregnene-3,20-dione 17-acetate, 1.5 g. of recrystallized 2,3,5,6-tetrachloro-1,4-benzoquinone (chloranil) and 60 ml. of tertiary amyl alcohol were heated to boiling under nitrogen with a few boiling chips, and gently refluxed for a period of about 6 hours. The mixture was cooled and evaporated to dryness under reduced pressure. The solid residue (with the exception of some chloranil, which was insoluble) was dissolved in about 100 ml. of ether and filtered. The chloranil on the filter paper was washed with several portions of ether and the combined ether filtrates washed with 200 ml. portions of cold 2% sodium hydroxide. The ether filtrates were washed with cold water until the washings were neutral, then with saturated sodium chloride solution. The pooled ether solutions were dried over sodium sulfate and evaporated to dryness. The residue crystallized readily from cold acetone to yield pure light-colored crystalline 6-fluoromethyl-17α-hydroxy-4,6-pregnadiene-3,20-dione 17-acetate.

PREPARATION 5

*3β,17α-dihydroxy-4-pregnen-20-one 17-acetate*

To a solution of 10 g. of 17α-hydroxy-4-pregnene-3,20-dione 17-acetate in 250 ml. of purified tetrahydrofuran, cooled to between 5° C. to −15° C., there is added in small portions and with stirring 20 g. of lithium aluminum tri-t-butoxyhydride. The reaction mixture is allowed to gradually come to room temperature and the excess lithium aluminum tri-t-butoxyhydride is destroyed by the addition of dilute acid. The reaction mixture is washed with dilute hydrochloric acid, dried and chromatographed over a Florisil (synthetic magnesium silicate) column packed wet with commercial hexanes. The column is eluted with commercial hexanes containing increasing amounts of acetone and those fractions which by thin layer chromatography and ultraviolet absorption show the presence of the desired product are taken to dryness and recrystallized from mixtures of acetone-water and acetone-commercial hexanes to yield 3β,17α-dihydroxy-4-pregnen-20-one 17-acetate, a crystalline solid.

In like manner, substituting a stoichiometric equivalent amount of

6α-methyl-17α-hydroxy-4-pregnene-3,20-dione 17-acetate
6α-fluoro-17α-hydroxy-4-pregnene-3,20-dione 17-acetate,
6α-chloro-17α-hydroxy-4-pregnene-3,20-dione 17-acetate,
6α-trifluoromethyl-17α-hydroxy-4-pregnene-3,20-dione 17-acetate,
6α-difluoromethyl-17α-hydroxy-4-pregnene-3,20-dione 17-acetate,
6α-fluoromethyl-17α-hydroxy-4-pregnene-3,20-dione 17-acetate,
16-methylene-17α-hydroxy-4-pregnene-3,20-dione 17-acetate,
6α-methyl-16-methylene-17α-hydroxy-4-pregnene-3,20-dione 17-acetate,
6α,16α-dimethyl-17α-hydroxy-4-pregnene-3,20-dione 17-acetate,
6α,16β-dimethyl-17α-hydroxy-4-pregnene-3,20-dione 17-acetate,
17α-hydroxy-4,6-pregnadiene-3,20-dione 17-acetate,
6-methyl-17α-hydroxy-4,6-pregnadiene-3,20-dione 17-acetate,
6-fluoro-17α-hydroxy-4,6-pregnadiene-3,20-dione 17-acetate,
6-chloro-17α-hydroxy-4,6-pregnadiene-3,20-dione 17-acetate,
6-trifluoromethyl-17α-hydroxy-4,6-pregnadiene-3,20-dione 17-acetate,
6-difluoromethyl-17α-hydroxy-4,6-pregnadiene-3,20-dione 17-acetate,
6-fluoromethyl-17α-hydroxy-4,6-pregnadiene-3,20-dione 17-acetate,
16-methylene-17α-hydroxy-4,6-pregnadiene-3,20-dione 17-acetate,
6-methyl-16-methylene-17α-hydroxy-4,6-pregnadiene-3,20-dione 17-acetate,
6,16α-dimethyl-17α-hydroxy-4,6-pregnadiene-3,20-dione 17-acetate, and
6,16β-dimethyl-17α-hydroxy-4,6-pregnadiene-3,20-dione 17-acetate, for 17α-hydroxy-4-pregnene-3,20-dione 17-acetate is productive of 3β,17α-dihydroxy-6α-methyl-4-pregnen-20-one 17-acetate,
3β,17α-dihydroxy-6α-fluoro-4-pregnen-20-one 17-acetate,
3β,17α-dihydroxy-6α-chloro-4-pregnen-20-one 17-acetate,
3β,17α-dihydroxy-6α-trifluoromethyl-4-pregnen-20-one 17-acetate,
3β,17α-dihydroxy-6α-difluoromethyl-4-pregnen-20-one 17-acetate,
3β,17α-dihydroxy-6α-fluoromethyl-4-pregnen-20-one 17-acetate,
3β,17α-dihydroxy-16-methylene-4-pregnen-20-one 17-acetate,
3β,17α-dihydroxy-6α-methyl-16-methylene-4-pregnen-20-one 17-acetate,
3β,17α-dihydroxy-6α,16α-dimethyl-4-pregnen-20-one 17-acetate,
3β,17α-dihydroxy-6α,16β-dimethyl-4-pregnen-20-one 17-acetate,
3β,17α-dihydroxy-4,6-pregnadien-20-one 17-acetate,
3β,17α-dihydroxy-6-methyl-4,6-pregnadien-20-one 17-acetate,
3β,17α-dihydroxy-6-fluoro-4,6-pregnadien-20-one 17-acetate,
3β,17α-dihydroxy-6-chloro-4,6-pregnadien-20-one 17-acetate,
3β,17α-dihydroxy-6-trifluoromethyl-4,6-pregnadien-20-one 17-acetate,
3β,17α-dihydroxy-6-difluoromethyl-4,6-pregnadien-20-one 17-acetate,
3β,17α-dihydroxy-6-fluoromethyl-4,6-pregnadien-20-one 17-acetate,
3β,17α-dihydroxy-16-methylene-4,6-pregnadien-20-one 17-acetate,
3β,17α-dihydroxy-6-methyl-16-methylene-4,6-pregnadien-20-one 17-acetate,
3β,17α-dihydroxy-6,16α-dimethyl-4,6-pregnadien-20-one 17-acetate, and
3β,17α-dihydroxy-6,16β-dimethyl-4,6-pregnadien-20-one 17-acetate, respectively.

EXAMPLE 1

*3β,17α-dihydroxy-4-pregnen-20-one 3-hemisuccinate 17-acetate (II)*

A solution is prepared containing 1 g. of 3β,17α-dihydroxy-4-pregnen-20-one 17-acetate in 10 ml. of pyridine and 1 g. of succinic anhydride. The solution is allowed to stand at 70°–80° C. for a period of about 8 hours, and is thereupon poured into ice water. The precipitated product is extracted into methylene chloride and washed with dilute acid, water, dried and evaporated to give crystals of 3β,17α-dihydroxy-4-pregnen-20-one 3-hemisuccinate 17-acetate which can be further purified by reprecipitation by dissolving in dilute cold sodium bicarbonate solution, filtering off the foreign material and reprecipitating the 3-hemisuccinate with dilute cold hydrochloric acid.

In like manner, substituting a stoichiometric equivalent amount of

3β,17α-dihydroxy-6α-methyl-4-pregnen-20-one 17-acetate,
3β,17α-dihydroxy-6α-fluoro-4-pregnen-20-one 17-acetate,
3β,17α-dihydroxy-6α-chloro-4-pregnen-20-one, 17-acetate,
3β,17α-dihydroxy-6α-trifluoromethyl-4-pregnene-20-one 17-acetate,
3β,17α-dihydroxy-6α-difluoromethyl-4-pregnen-20 one 17-acetate,
3β,17α-dihydroxy-6α-fluoromethyl-4-pregnen-20-one 17-acetate,
3β,17α-dihydroxy-16-methylene-4-pregnen-20-one 17-acetate,
3β,17α-dihydroxy-6α-methyl-16-methylene-4-pregnen-20-one 17-acetate,
3β,17α-dihydroxy-6α,16α-dimethyl-4-pregnen-20-one 17-acetate,
3β,17α-dihydroxy-6α,16β-dimethyl-4-pregnen-20-one 17-acetate,
3β,17α-dihydroxy-4,6-pregnadien-20-one 17-acetate,
3β,17α-dihydroxy-6-methlyl-4,6-pregnadien-20-one 17-acetate,
3β,17α-dihydroxy-6-chloro-4,6-pregnadien-20-one 17-acetate,
3β,17α-dihydroxy-6-trifluoromethyl-4,6-pregnadien-20-one 17-acetate,
3β,17α-dihydroxy-6-difluoromethyl-4,6-pregnadien-20-one 17-acetate,
3β,17α-dihydroxy-6-fluoromethyl-4,6-pregnadien-20-one 17-acetate,
3β,17α-dihydroxy-16-methylene-4,6-pregnadien-20-one 17-acetate,
3β,17α-dihydroxy-6-methyl-16-methylene-4,6-pregnadien-20-one 17-acetate,
3β,17α-dihydroxy-6,16α-dimethyl-4,6-pregnadien-20-one 17-acetate, and
3β,17α-dihydroxy-6,16β-dimethyl-4,6-pregnadien-20-one 17-acetate, for 3β,17α-dihydroxy-4-pregnen-20-one 17-acetate is productive of 3β,17α-dihydroxy-6α-methyl-4-pregnen-20-one 3-hemisuccinate 17-acetate, 3β,17α-dihydroxy-6α-fluoro-4-pregnen-20-one
  3-hemisuccinate 17-acetate,
3β,17α-dihydroxy-6α-chloro-4-pregnen-20-one
  3-hemisuccinate 17-acetate,
3β,17α-dihydroxy-6α-trifluoromethyl-4-pregnen-20-one
  3-hemisuccinate 17-acetate,
3βα,17α-dihydroxy-6α-difluoromethyl-4-pregnen-20-one
  3-hemisuccinate 17-acetate,
3β,17α-dihydroxy-6α-fluoromethyl-4-pregnen-20-one
  3-hemisuccinate 17-acetate,
3β,17α-dihydroxy-16-methylene-4-pregnen-20-one
  3-hemisuccinate 17-acetate,
3β,17α-dihydroxy-6α-methyl-16-methylene-4-pregnen-20-one 3-hemisuccinate 17-acetate,
3β,17α-dihydroxy-6α,16α-dimethyl-4-pregnen-20-one
  3-hemisuccinate 17-acetate,
3β,17α-dihydroxy-6α,17β-dimethyl-4-pregnen-20-one
  3-hemisuccinate 17-acetate,
3β,17α-dihydroxy-4,6-pregnadiene-20-one 3-hemisuccinate 17-acetate,
3β,17α-dihydroxy-6-methlyl-4,6-pregnadien-20-one
  3-hemisuccinate 17-acetate,
3β,17α-dihydroxy-6-fluoro-4,6-pregnadien-20-one
  3-hemisuccinate 17-acetate,
3β,17α-dihydroxy-6-chloro-4,6-pregnadien-20-one
  3-hemisuccinate 17-acetate,
3β,17α-dihydroxy-6-trifluoromethyl-4,6-pregnadien-20-one 3-hemisuccinate 17-acetate,
3β,17α-dihydroxy-6-difluoromethyl-4,6-pregnadien-20-one 3-hemisuccinate 17-acetate,
3β,17α-dihydroxy-6-fluoromethyl-4,6-pregnadien-20-one, 3-hemisuccinate 17-acetate,
3β,17α-dihydroxy-16-methylene-4,6-pregnadien-20-one 3-hemisuccinate 17-acetate,
3β,17α-dihydroxy-6-methyl-16-methylene-4,6-pregnadien-20-one, 3-hemisuccinate 17-acetate,
3β,17α-dihydroxy-6,16α-dimethyl-4,6-pregnadien-20-one 3-hemisuccinate 17-acetate, and
3β,17α-dihydroxy-6,16β-dimethyl-4,6-pregnadien-20-one 3-hemisuccinate 17-acetate, respectively.

Similarly, reacting the 3β,17α-dihydroxy steroid 17-acetate starting materials with the appropriate hydrocarbon dicarboxylic acid, or the acid anhydrides or acid halides thereof, is productive of the corresponding 3-acylates, such as, for example, the 3-hemimalonate, the 3-hemiglutarate, the 3-hemiadipate, the 3-hemipimelate, the 3-hemisuberate, the 3-hemi-α,β-dimethylsuccinate, the 3-hemi-α,β-diethylsuccinate, the 3-hemi-β-methylglutarate, the 3-hemi-α,β-dimethylglutarate, the 3-hemi-α,α-diethylglutarate, the 3-hemi-β,β-dimethylglutarate, the 3-hemi-α-ethyl-β-methylglutarate, the 3-hemi-β-ethyl-β-methylglutarate, the 3-hemi-α,α,β-trimethylglutarate, the 3-hemi-α,β,β-trimethylglutarate, the 3-hemi-α,β,γ-trimethylglutarate, the 3-hemi-α-ethyl-β,β-dimethylglutarate, the 3-hemi-α,β,β-tetramethylglutarate, the 3-hemi-α,β,β,γ-tetramethylglutarate, the 3-hemi-β-methyl-β-butylglutarate, the 3-hemi-β-methyl-β-isobutylglutarate, the 3-hemi-α-methyladipate, the 3-hemi-α,α-dimethyladipate, the 3-hemimaleate, the 3-hemi-citraconate, the 3-hemi-(o-, m-, p-phthalate), the 3-hemi-diglycolate, and the like, of
3β,17α-dihydroxy-4-pregnen-20-one 17-acetate,
3β,17α-dihydroxy-6α-methyl-4-pregnen-20-one 17-acetate,
3β,17α-dihydroxy-6α-fluoro-4-pregnen-20-one 17-acetate,
3β,17α-dihydroxy-6α-chloro-4-pregnen-20-one 17-acetate,
3β,17α-dihydroxy-6α-trifluoromethyl-4-pregnen-20-one
  17-acetate,
3β,17α-dihydroxy-6α-difluoromethyl-4-pregnen-20-one
  17-acetate,
3β,17α-dihydroxy-6α-fluoromethyl-4-pregnen-20-one
  17-acetate,
3β,17α-dihydroxy-16-methylene-4-pregnen-20-one
  17-acetate,
3β,17α-dihydroxy-6α-methyl-16-methylene-4-pregnen-20-one 17-acetate,
3β,17α-dihydroxy-6α,16α-dimethyl-4-pregnen-20-one
  17-acetate,
3β,17α-dihydroxy-6α,16β-dimethyl-4-pregnen-20-one
  17-acetate,
3β,17α-dihydroxy-4,6-pregnadien-20-one 17-acetate,
3β,17α-dihydroxy-6-methyl-4,6-pregnadien-20-one
  17-acetate,
3β,17α-dihydroxy-6-fluoro-4,6-pregnadien-20-one
  17-acetate,
3β,17α-dihydroxy-6-chloro-4,6-pregnadien-20-one
  17-acetate,
3β,17α-dihydroxy-6-trifluoromethyl-4,6-pregnadien-20-one 17-acetate,
3β,17α-dihydroxy-6-difluoromethyl-4,6-pregnadien-20-one 17-acetate,
3β,17α-dihydroxy-6-fluoromethyl-4,6-pregnadien-20-one 17-acetate,
3β,17α-dihydroxy-16-methylene-4,6-pregnadien-20-one 17-acetate,
3β,17α-dihydroxy-6-methyl-16-methylene-4,6-pregnadien-20-one 17-acetate,
3β,17α-dihydroxy-6,16α-dimethyl-4,6-pregnadien-20-one 17-acetate, and
3β,17α-dihydroxy-6,16β-dimethyl-4,6-pregnadien-20-one 17-acetate.

In the above procedures the esterifying agent is preferably the anhydride. However, when the esterifying agent is the free acid, the reaction is carried out in the presence of an esterification catalyst.

If the corresponding acylating agent is solid, an inert solvent such as toluene, methylene chloride, dimethylformamide or dioxane can be added if desired to effect solution and to provide a liquid esterification medium.

Where the esterification reaction does not proceed to completion at room temperature, the temperature can be raised from room temperature to as high as 90° C. The course of the reaction is conveniently followed by thin layer chromatography on alumina or Florisil (synthetic magnesium silicate) using disappearance of the 3-hydroxy starting material as the end-point. Hindered anhydrides of hydrocarbon carboxylic acids react more slowly than succinic anhydride and, if incomplete reaction at room temperature is observed after 24 hours, the temperature is raised, preferably to about 65° C., and the reaction permitted to proceed to completion.

EXAMPLE 2

*3β,17α-dihydroxy-4-pregnen-20-one 3-sodium succinate 17-acetate (III)*

1.0 g. of 3β,17α-dihydroxy-4-pregnen-20-one 3-hemisuccinate 17-acetate is dissolved in 25 ml. of acetone and filtered through a medium porosity glass filter. The thus obtained solution is cooled in an ice bath and there is added thereto a filtered aqueous solution of exactly one equivalent (0.177 g.) of sodium bicarbonate. The resulting solution is concentrated under house vacuum, at a temperature not exceeding 25° C., to remove the acetone and lyophilized under high vacuum to yield 3β,17α-dihydroxy-4-pregnen-20-one 3-sodium succinate 17-acetate, a fluffy white solid which is very water soluble.

In like manner, substituting a stoichiometric equivalent amount of
3β,17α-dihydroxy-6α-methyl-4-pregnen-20-one 3-hemisuccinate 17-acetate,
3β,17α-dihydroxy-6α-fluoro-4-pregnen-20-one 3-hemisuccinate 17-acetate,
3β,17α-dihydroxy-6α-chloro-4-pregnen-20-one 3-hemisuccinate 17-acetate,
3β,17α-dihydroxy-6α-trifluoromethyl-4-pregnen-20-one
  3-hemisuccinate 17-acetate,
3β,17α-dihydroxy-6α-difluoromethyl-4-pregnen-20-one
  3-hemisuccinate 17-acetate,
3β,17α-dihydroxy-6α-fluoromethyl-4-pregnen-20-one
  3-hemisuccinate 17-acetate, 3β,17α-dihydroxy-16-methylene-4-pregnen-20-one 3-hemisuccinate 17-acetate,
3β,17α-dihydroxy-6α-methyl-16-methylene-4-pregnen-20-one 3-hemisuccinate 17-acetate,
3β,17α-dihydroxy-6α,16α-dimethyl-4-pregnen-20-one 3-hemisuccinate 17-acetate,
3β,17α-dihydroxy-6α,16β-dimethyl-4-pregnen-20-one 3-hemisuccinate 17-acetate,
3β,17α-dihydroxy-4,6-pregnadien-20-one 3-hemisuccinate 17-acetate,
3β,17α-dihydroxy-6-methyl-4,6-pregnadien-20-one 3-hemisuccinate 17-acetate,
3β,17α-dihydroxy-6-fluoro-4,6-pregnadien-20-one 3-hemisuccinate 17-acetate,
3β,17α-dihydroxy-6-chloro-4,6-pregnadien-20-one 3-hemisuccinate 17-acetate,
3β,17α-dihydroxy-6-trifluoromethyl-4,6-pregnadien-20-one 3-hemisuccinate 17-acetate,
3β,17α-dihydroxy-6-difluoromethyl-4,6-pregnadien-20-one 3-hemisuccinate 17-acetate,
3β,17α-dihydroxy-6-fluoromethyl-4,6-pregnadien-20-one 3-hemisuccinate 17-acetate,
3β,17α-dihydroxy-16-methylene-4,6-pregnadien-20-one 3-hemisuccinate 17-acetate,
3β,17α-dihydroxy-6-methyl-16-methylene-4,6-pregnadien-20-one 3-hemisuccinate 17-acetate,
3β,17α-dihydroxy-6,16α-dimethyl-4,6-pregnadien-20-one 3-hemisuccinate 17-acetate, and
3β,17α-dihydroxy-6,16β-dimethyl-4,6-pregnadien-20-one 3-hemisuccinate 17-acetate, for 3β,17α-dihydroxy-4-pregnen-20-one 3-hemisuccinate 17-acetate is productive of 3β,17α-dihydroxy-6α-methyl-4-pregnen-20-one 3-sodium succinate 17-acetate,
3β,17α-dihydroxy-6α-fluoro-4-pregnen-20-one 3-sodium succinate 17-acetate,
3β,17α-dihydroxy-6α-chloro-4-pregnen-20-one 3-sodium succinate 17-acetate,
3β,17α-dihydroxy-6α-trifluoromethyl-4-pregnen-20-one 3-sodium succinate 17-acetate,
3β,17α-dihydroxy-6α-difluoromethyl-4-pregnen-20-one 3-sodium succinate 17-acetate,
3β,17α-dihydroxy-6α-fluoromethyl-4-pregnen-20-one 3-sodium succinate 17-acetate,
3β,17α-dihydroxy-16-methylene-4-pregnen-20-one 3-sodium succinate 17-acetate,
3β,17α-dihydroxy-6α-methyl-16-methylene-4-pregnen-20-one 3-sodium succinate 17-acetate,
3β,17α-dihydroxy-6α,16α-dimethyl-4-pregnen-20-one 3-sodium succinate 17-acetate,
3β,17α-dihydroxy-6α,16β-dimethyl-4-pregnen-20-one 3-sodium succinate 17-acetate,
3β,17α-dihydroxy-4,6-pregnadiene-20-one 3-sodium succinate 17-acetate,
3β,17α-dihydroxy-6-methyl-4,6-pregnadien-20-one 3-sodium succinate 17-acetate,
3β,17α-dihydroxy-6-fluoro-4,6-pregnadien-20-one 3-sodium succinate 17-acetate,
3β,17α-dihydroxy-6-chloro-4,6-pregnadien-20-one 3-sodium succinate 17-acetate,
3β,17α-dihydroxy-6-trifluoromethyl-4,6-pregnadien-20-one 3-sodium succinate 17-acetate,
3β,17α-dihydroxy-6-difluoromethyl-4,6-pregnadien-20-one 3-sodium succinate 17-acetate,
3β,17α-dihydroxy-6-fluoromethyl-4,6-pregnadien-20-one 3-sodium succinate 17-acetate,
3β,17α-dihydroxy-16-methylene-4,6-pregnadien-20-one 3-sodium succinate 17-acetate,
3β,17α-dihydroxy-6-methyl-16-methylene-4,6-pregnadien-20-one 3-sodium succinate 17-acetate,
3β,17α-dihydroxy-6,16α-dimethyl-4,6-pregnadien-20-one 3-sodium succinate 17-acetate, and
3β,17α-dihydroxy-6,16β-dimethyl-4,6-pregnadien-20-one 3-sodium succinate 17-acetate, respectively.

Similarly, reacting the 3β,17α-dihydroxy-steroid 3-hemiacylate 17-acetate starting materials with sodium bicarbonate, using the procedure set forth above, is productive of the corresponding 3-sodium acylates, such as, for example, the 3-sodium malonate, the 3-sodium glutarate, the 3-sodium adipate, the 3-sodium pimelate, the 3-sodium suberate, the 3-sodium α,β-dimethylsuccinate, the 3-sodium α,β-diethylsuccinate, the 3-sodium β-methylglutarate, the 3-sodium α,β-dimethylglutarate, the 3-sodium α,α-diethylglutarate, the 3-sodium β,β-dimethylglutarate, the 3-sodium α-ethyl-β-methylglutarate, the 3-sodium β-ethyl-β-methylglutarate, the 3-sodium α,α,β-trimethylglutarate, the 3-sodium α,β,β-trimethylglutarate, the 3-sodium α,β,γ-trimethylglutarate, the 3-sodium α-ethyl-β,β-dimethylglutarate, the 3-sodium α,α,β,β-tetramethylglutarate, the 3-sodium α,β,β,γ-tetramethylglutarate, the 3-sodium β-methyl-β-butylglutarate, the 3-sodium β-methyl-β-isobutylglutarate, the 3-sodium α-methyladipate, the 3-sodium α,α-dimethyladipate, the 3-sodium maleate, the 3-sodium citraconate, the 3-sodium (o-, m-, p-phthalate), the 3-sodium diglycolate, and the like, of 3β,17α-dihydroxy-4-pregnen-20-one 17-acetate,
3β,17α-dihydroxy-6α-methyl-4-pregnen-20-one 17-acetate,
3β,17α-dihydroxy-6α-fluoro-4-pregnen-20-one 17-acetate,
3β,17α-dihydroxy-6α-chloro-4-pregnen-20-one 17-acetate,
3β,17α-dihydroxy-6α-trifluoromethyl-4-pregnen-20-one 17-acetate,
3β,17α-dihydroxy-6α-difluoromethyl-4-pregnen-20-one 17-acetate,
3β,17α-dihydroxy-6α-fluoromethyl-4-pregnen-20-one 17-acetate,
3β,17α-dihydroxy-16-methylene-4-pregnen-20-one 17-acetate,
3β,17α-dihydroxy-6α-methyl-16-methylene-4-pregnen-20-one 17-acetate,
3β,17α-dihydroxy-6α,16α-dimethyl-4-pregnen-20-one 17-acetate,
3β,17α-dihydroxy-6α,16β-dimethyl-4-pregnen-20-one 17-acetate,
3β,17α-dihydroxy-4,6-pregnadien-20-one 17-acetate,
3β,17α-dihydroxy-6-methyl-4,6-pregnadien-20-one 17-acetate,
3β,17α-dihydroxy-6-fluoro-4,6-pregnadien-20-one 17-acetate,
3β,17α-dihydroxy-6-chloro-4,6-pregnadien-20-one 17-acetate,
3β,17α-dihydroxy-6-trifluoromethyl-4,6-pregnadien-20-one 17-acetate,
3β,17α-dihydroxy-6-difluoromethyl-4,6-pregnadien-20-one 17-acetate,
3β,17α-dihydroxy-6-fluoromethyl-4,6-pregnadien-20-one 17-acetate,
3β,17α-dihydroxy-16-methylene-4,6-pregnadien-20-one 17-acetate,
3β,17α-dihydroxy-6-methyl-16-methylene-4,6-pregnadien-20-one 17-acetate,
3β,17α-dihydroxy-6,16α-dimethyl-4,6-pregnadien-20-one 17-acetate, and
3β,17α-dihydroxy-6,16β-dimethyl-4,6-pregnadien-20-one 17-acetate.

Likewise, substituting a stoichiometric equivalent amount of potassium or lithium bicarbonate for sodium bicarbonate is productive of the corresponding potassium or lithium salts otherwise corresponding to the sodium salt of the steroids of this example, Example 2.

EXAMPLE 3

3β,17α-dihydroxy-4-pregnen-20-one 3-chloroacetate 17-acetate (IV)

To a mixture of 2 g. of 3β,17α-dihydroxy-4-pregnen-20-one 17-acetate in 5 ml. of pyridine there is added a freshly prepared solution of 1.0 g. of chloroacetic anhydride in 30 ml. of ether at 0°–5° C. A stream of nitrogen is passed through until the ether has been evaporated. The excess anhydride is destroyed by the addition of 0.1 ml. of water after which the reaction mixture is poured into 100 ml. of water with vigorous stirring. The precipitated product is filtered, dried and recrystallized to give substantially pure 3β,17α-dihydroxy-4-pregnen-20-one 3-chloroacetate 17-acetate.

In like manner, substituting a stoichiometric equivalent amount of

3β,17α-dihydroxy-6α-methyl-4-pregnen-20-one 17-acetate,
3β,17α-dihydroxy-6α-fluoro-4-pregnen-20-one 17-acetate,
3β,17α-dihydroxy-6α-chloro-4-pregnen-20-one 17-acetate,
3β,17α-dihydroxy-6α-trifluoromethyl-4-pregnen-20-one 17-acetate,
3β,17α-dihydroxy-6α-difluoromethyl-4-pregnen-20-one 17-acetate,
3β,17α-dihydroxy-6α-fluoromethyl-4-pregnen-20-one 17-acetate,
3β,17α-dihydroxy-16-methylene-4-pregnen-20-one 17-acetate,
3α,17β-dihydroxy-6α-methyl-16-methylene-4-pregnen-20-one 17-acetate,
3α,17β-dihydroxy-6α,16α-dimethyl-4-pregnen-20-one 17-acetate,
3β,17α-dihydroxy-6α,16α-dimethyl-4-pregnen-20-one 17-acetate,
3β,17α-dihydroxy-6α,16β-dimethyl-4-pregnen-20-one 17-acetate,
3β,17α-dihydroxy-4-6-pregnadien-20-one 17 acetate,
3β,17α-dihydroxy-6-methyl-4,6-pregnadien-20-one 17-acetate,
3β,17α-dihydroxy-6-fluoro-4,6-pregnadien-20-one 17-acetate
3β,17α-dihydroxy-6-chloro-4,6-pregnadien-20-one 17-acetate,
3β,17α-dihydroxy-6-trifluoromethyl-4,6-pregnadien-20-one 17-acetate,
3β,17α-dihydroxy-6-difluoromethyl-4,6-pregnadien-20-one 17-acetate,
3β,17α-dihydroxy-6-fluoromethyl-4,6-pregnadien-20-one 17-acetate,
3β,17α-dihydroxy-16-methylene-4,6-pregnadien-20-one 17-acetate,
3β,17α-dihydroxy-6-methyl-16-methylene-4,6-pregnadien-20-one 17-acetate,
3β,17α-dihydroxy-6,16α-dimethyl-4,6-pregnadien-20-one 17 acetate, and
3β,17α-dihydroxy-6,16β-dimethyl-4,6-pregnadien-20-one 17-acetate, for 3β,17α-dihydroxy-4-pregnen-20-one 17-acetate is productive of 3β,17α-dihydroxy-6α-methyl-4-pregnen-20-one 3-chloroacetate 17-acetate,
3β,17α-dihydroxy-6α-fluoro-4-pregnen-20-one 3-chloroacetate 17-acetate,
3β,17α-dihydroxy-6α-chloro-4-pregnen-20-one 3-chloroacetate 17-acetate,
3β,17α-dihydroxy-6α-trifluoromethyl-4-pregnen-20-one 3-chloroacetate 17-acetate,
3β,17α-dihydroxy-6α-difluoromethyl-4-pregnen-20-one 3-chloroacetate 17-acetate,
3β,17α-dihydroxy-6α-fluoromethyl-4-pregnen-20-one 3-chloroacetate 17-acetate,
3β,17α-dihydroxy-16-methylene-4-pregnen-20-one 3-chloroacetate 17-acetate,
3β,17α-dihyodrxy-6α-methyl-16-methylene-4-pregnen-20-one 3-chloroacetate 17-acetate,
3β,17α-dihydroxy-6α,16α-dimethyl-4-pregnen-20-one 3-chloroacetate 17-acetate,
3β,17α-hydroxy-6α,16β-dimethyl-4-pregnen-20-one 3-chloroacetate 17-acetate,
3β,17α-dihydroxy-4,6-pregnadien-20-one 3 chloroacetate 17-acetate,
3β,17α-dihydroxy-6-methyl-4,6-pregnadien-20-one 3-chloroacetate 17-acetate,
3β,17α-dihydroxy-6-fluoro-4,6-pregnadien-20-one 3-chloroacetate 17-acetate,
3β,17α-dihydroxy-6-chloro-4,6-pregnadien-20-one 3-chloroacetate 17-acetate,
3β,17α-dihydroxy-6-trifluoromethyl-4,6-pregnadien-20-one 3-chloroacetate 17-acetate,
3β,17α-dihydroxy-6-difluoromethyl-4,6-pregnadien-20-one 3-chloroacetate 17-acetate,
3β,17α-dihydroxy-6-fluoromethyl-4,6-pregnadien-20-one 3-chloroacetate 17-acetate,
3β,17α-dihydroxy-16-methylene-4,6-pregnadien-20-one 3-chloroacetate 17-acetate,
3β,17α-dihydroxy-6-methyl-16-methylene-4,6-pregnadien-20-one, 3-chloroacetate 17-acetate
3β,17α-dihydroxy-6,16α-dimethyl-4,6-pregnadien-20-one 3-chloroacetate 17-acetate, and
3β,17α-dihydroxy-6,16β-dimethyl-4,6-pregnadien-20-one 3-chloroacetate 17-acetate, respectively.

Similarly, substituting a stoichiometric equivalent amount of bromoacetic anhydride for chloroacetic anhydride is productive of the corresponding 3-bromoacetate steroids otherwise corresponding to the 3-chloroacetates of this example, Example 3.

EXAMPLE 4

*3β,17α-dihydroxy-4-pregnen-20-one 3-diethylaminoacetate 17-acetate (V)*

1 g. of 3β,17α-dihydroxy-4-pregnen-20-one 3-chloroacetate 17-acetate is dissolved in 15 ml. of dry tetrahydrofuran and to the solution is added a solution of 2.7 ml. of diethylamine in 15 ml. of dry tetrahydrofuran. The reaction mixture is heated in a sealed tube at 50°–60° C. for about 16 hours then cooled and filtered. The filtrate is concentrated almost to dryness at reduced pressure to give a residue of 3β,17α-dihydroxy-4-pregnen-20-one 3-diethylaminoacetate 17-acetate.

In like manner, substituting a stoichiometric equivalent amount of

3β,17α-dihydroxy-6α-methyl-4-pregnan-20-one 3-chloroacetate 17-acetate
3β,17α-dihydroxy-6α-fluoro-4-pregnen-20-one 3-chloroacetate 17-acetate
3β,17α-dihydroxy-6α-chloro-4-pregnen-20-one 3-chloroacetate 17-acetate
3β,17α-dihydroxy-6α-trifluoromethyl-4-pregnen-20-one 3-chloroacetate 17-acetate,
3β,17α-dihydroxy-6α-difluoromethyl-4-pregnen-20-one 3-chloroacetate 17-acetate,
3β,17α-dihydroxy-6α-fluoromethyl-4-pregnen-20-one 3-chloroacetate 17-acetate,
3β,17α-dihydroxy-16-methylene-4-pregnen-20-one 3-chloroacetate 17-acetate,
3β,17α-dihydroxy-6α-methyl-16-methylene-4-pregnen-20-one 3-chloroacetate 17-acetate,
3β,17α-dihydroxy-6α,16α-dimethyl-4-pregnen-20-one 3-chloroacetate 17-acetate,
3β,17α-dihydroxy-6α,16β-dimethyl-4-pregnen-20-one 3-chloroacetate 17-acetate,
3β,17α-dihydroxy-4,6-pregnadien-20-one 3-chloroacetate 17-acetate,
3β,17α-dihydroxy-6-methyl-4,6-pregnadien-20-one 3-chloroacetate 17-acetate,
3β,17α-dihydroxy-6-fluoro-4,6-pregnadien-20-one 3-chloroacetate 17-acetate,
3β,17α-dihydroxy-6-chloro-4,6-pregnadien-20-one 3-chloroacetate 17-acetate,
3β,17α-dihydroxy-6-trifluoromethyl-4,6-pregnadien-20-one 3-chloroacetate 17-acetate,
3β,17α-dihydroxy-6-difluoromethyl-4,6-pregnadien-20-one 3-chloroacetate 17-acetate,
3β,17α-dihydroxy-6-fluoromethyl-4,6-pregnadien-20-one 3-chloroacetate 17-acetate,
3β,17α-dihydroxy-16-methylene-4,6-pregnadien-20-one 3-chloroacetate 17-acetate,
3β,17α-dihydroxy-6-methyl-16-methylene-4,6-pregnadien-20-one 3-chloroacetate 17-acetate, 3β,17α-dihydroxy-6,16α-dimethyl-4,6-pregnadien-
  20-one 3-chloroacetate 17-acetate, and
3β,17α-dihydroxy-6,16β-dimethyl-4,6-pregnadien-
  20-one 3-chloroacetate 17-acetate, for 3β,17α-dihydroxy-4-pregnen-20-one 3-chloroacetate 17-acetate is productive of 3β,17α-dihydroxy-6α-methyl-4-pregnen-20-one
  3-diethylaminoacetate 17-acetate,
3β,17α-dihydroxy-6α-fluoro-4-pregnen-20-one
  3-diethylaminoacetate 17-acetate,
3β,17α-dihydroxy-6α-chloro-4-pregnen-20-one
  3-diethylaminoacetate 17-acetate,
3β,17α-dihydroxy-6α-trifluoromethyl-4-pregnen-20-one
  3-diethylaminoacetate 17-acetate,
3β,17α-dihydroxy-6α-difluoromethyl-4-pregnen-20-one
  3-diethylaminoacetate 17-acetate,
3β,17α-dihydroxy-6α-fluoromethyl-4-pregnen-20-one
  3-diethylaminoacetate 17-acetate,
3β,17α-dihydroxy-16α-methylene-4-pregnen-20-one
  3-diethylaminoacetate 17-acetate,
3β,17α-dihydroxy-6α-methyl-16-methylene-4-pregnen-
  20-one 3-diethylaminoacetate 17-acetate,
3β,17α-dihydroxy-6α,16α-dimethyl-4-pregnen-20-one
  3-diethylaminoacetate 17-acetate,
3β,17α-dihydroxy-6α,16β-dimethyl-4-pregnen-20-one
  3-diethylaminoacetate 17-acetate,
3β,17α-dihydroxy-4,6-pregnadien-20-one
  3-diethylaminoacetate 17-acetate,
3β,17α-dihydroxy-6-methyl-4,6-pregnadien-20-one
  3-diethylaminoacetate 17-acetate,
3β,17α-dihydroxy-6-fluoro-4,6-pregnadien-20-one
  3-diethylaminoacetate 17-acetate,
3β,17α-dihydroxy-6-chloro-4,6-pregnadien-20-one
  3-diethylaminoacetate 17-acetate,
3β,17α-dihydroxy-6-trifluoromethyl-4,6-pregnadien-
  20-one 3-diethylaminoacetate 17-acetate,
3β,17α-dihydroxy-6-difluoromethyl-4,6-pregnadien-
  20-one 3-diethylaminoacetate 17-acetate,
3β,17α-dihydroxy-6-fluoromethyl-4,6-pregnadien-20-one
  3-diethylaminoacetate 17-acetate,
3β,17α-dihydroxy-16-methylene-4,6-pregnadien-20-one
  3-diethylaminoacetate 17-acetate,
3β,17α-dihydroxy-6-methyl-16-methylene-4,6-pregnadien-
  20-one 3-diethylaminoacetate 17-acetate,
3β,17α-dihydroxy-6,16α-dimethyl-4,6-pregnadien-20-one
  3-diethylaminoacetate 17-acetate, and
3β,17α-dihydroxy-6,16β-dimethyl-4,6-pregnadien-20-one
  3-diethylaminoacetate 17-acetate, respectively.

Similarly, reacting the 3β,17α-dihydroxy steroid-3-chloroacetates with the appropriate amine there are obtained the corresponding 3-aminoacetate esters, such as, for example, the 3-dimethylaminoacetate, the 3-dipropylaminoacetate, the 3-dioctylaminoacetate, the 3-(methylethylaminoacetate), the 3-(methylproplaminoacetate), the 3-dibenzylaminoacetate, the 3-(methylbenzylaminoacetate), the 3-pyrrolidinoacetate, the 3-piperidinoacetate, the 3-morpholinoacetate, and the like, of 3β,17α-dihydroxy-4-pregnen-20-one 17-acetate,
3β,17α-dihydroxy-6α-methyl-4-pregnen-20-one 17-acetate,
3β,17α-dihydroxy-6α-fluoro-4-pregnen-20-one 17-acetate,
3β,17α-dihydroxy-6α-chloro-4-pregnen-20-one 17-acetate,
3β,17α-dihydroxy-6α-trifluoromethyl-4-pregnen-20-one
  17-acetate,
3β,17α-dihydroxy-6α-difluoromethyl-4-pregnen-20-one
  17-acetate,
3β,17α-dihydroxy-6α-fluoromethyl-4-pregnen-20-one 1-
  acetate,
3β,17α-dihydroxy-16-methylene-4-pregnen-20-one 17-
  acetate,
3β,17α-dihydroxy-6α-methyl-16-methylene-4-pregnen-20-
  one 17-acetate,
3β,17α-dihydroxy-6α,16α-dimethyl-4-pregnen-20-one 17-
  acetate,
3β,17α-dihydroxy-6α,16β-dimethyl-4-pregnen-20-one 17-
  acetate,
3β,17α-dihydroxy-4,6-pregnadien-20-one 17-acetate,
3β,17α-dihydroxy-6-methyl-4,6-pregnadien-20-one 17-
  acetate,
3β,17α-dihydroxy-6-fluoro-4,6-pregnadien-20-one 17-
  acetate,
3β,17α-dihydroxy-6-chloro-4,6-pregnadien-20-one 17-
  acetate,
3β,17α-dihydroxy-6-trifluoromethyl-4,6-pregnadien-20-
  one 17-acetate,
3β,17α-dihydroxy-6-difluoromethyl-4,6-pregnadien-20-one
  17-acetate,
3β,17α-dihydroxy-6-fluoromethyl-4,6-pregnadien-20-one
  17-acetate,
3β,17α-dihydroxy-16-methylene-4,6-pregnadien-20-one
  17-acetate,
3β,17α-dihydroxy-6-methyl-16-methylene-4,6-pregnadien-
  20-one 17-acetate,
3β,17α-dihydroxy-6,16α-dimethyl-4,6-pregnadien-20-one
  17-acetate, and
3β,17α-dihydroxy-6,16β-dimethyl-4,6-pregnadien-20-one
  17-acetate.

Likewise, substituting 3β,17α - dihydroxy steroid 3-bromoacetates for the corresponding 3β,17α-dihydroxy steroid 3-chloroacetates is productive of 3β,17α-dihydroxy steroid 3-aminoacetates described in this example, Example 4.

EXAMPLE 5

*3β,17α-dihydroxy-4-pregnen-20-one 3-diethylamino-
acetate 17-acetate hydrochloride (VI)*

1.0 g. of 3β,17α-dihydroxy-4-pregnen-20-one 3-diethylaminoacetate 17-acetate is stirred in 25 ml. of absolute ether and an equivalent amount plus 10% excess of ethereal hydrogen chloride is added. The precipitated solid is collected and washed with dry ether to give 3β,17α-dihydroxy-4-pregnen-20-one 3-diethylaminoacetate 17-acetate hydrochloride, a light colored solid.

In like manner substituting a stoichiometric equivalent amount of

3β,17α-dihydroxy-6α-methyl-4-pregnen-20-one 3-diethyl-
  aminoacetate 17-acetate,
3β,17α-dihydroxy-6α-fluoro-4-pregnen-20-one 3-diethyl-
  aminoacetate 17-acetate,
3β,17α-dihydroxy-6α-chloro-4-pregnen-20-one 3-diethyl-
  aminoacetate 17-acetate,
3β,17α-dihydroxy-6α-trifluoromethyl-4-pregnen-20-one 3-
  diethylaminoacetate 17-acetate,
3β,17α-dihydroxy-6α-difluoromethyl-4-pregnen-20-one 3-
  diethylaminoacetate 17-acetate,
3β,17α-dihydroxy-6α-fluoromethyl-4-pregnen-20-one 3-
  diethylaminoacetate 17-acetate,
3β,17α-dihydroxy-16-methylene-4-pregnen-20-one 3-di-
  ethylaminoacetate 17-acetate,
3β,17α-dihydroxy-6α,16α-dimethyl-4-pregnen-20-one 3-
  diethylaminoacetate 17-acetate,
3β,17α-dihydroxy-6α,16β-dimethyl-4-pregnen-20-one 3-
  diethylaminoacetate 17-acetate,
3β,17α-dihydroxy-4,6-pregnadien-20-one 3-diethylamino-
  acetate 17-acetate,
3β,17α-dihydroxy-6-methyl-4,6-pregnadien-20-one 3-di-
  ethylaminoacetate 17-acetate,
3β,17α-dihydroxy-6-fluoro-4,6-pregnadien-20-one 3-di-
  ethylaminoacetate 17-acetate,
3β,17α-dihydroxy-6-chloro-4,6-pregnadien-20-one 3-di-
  ethylaminoacetate 17-acetate,
3β,17α-dihydroxy-6-trifluoromethyl-4,6-pregnadien-20-
  one 3-diethylaminoacetate 17-acetate,
3β,17α-dihydroxy-6-difluoromethyl-4,6-pregnadien-20-one
  3-diethylaminoacetate 17-acetate,
3β,17α-dihydroxy-6-fluoromethyl-4,6-pregnadien-20-one
  3-diethylaminoacetate 17-acetate,
3β,17α-dihydroxy-16-methylene-4,6-pregnadien-20-one
  3-diethylaminoacetate 17-acetate, 3β,17α-dihydroxy-6-methyl-16-methylene-4,6-pregnadien-20-one 3-diethylaminoacetate 17-acetate,
3β,17α-dihydroxy-6,16α-dimethyl-4,6-pregnadien-20-one 3-diethylaminoacetate 17-acetate, and
3β,17α-dihydroxy-6,16β-dimethyl-4,6-pregnadien-20-one 3-diethylaminoacetate 17-acetate, for 3β,17α-dihydroxy-4-pregnen-20-one 3-diethylaminoacetate 17-acetate is productive of 3β,17α-dihydroxy-6α-methyl-4-pregnen-20-one 3-diethylaminoacetate 17-acetate hydrochloride,
3β,17α-dihydroxy-6α-fluoro-4-pregnen-20-one 3-diethylaminoacetate 17-acetate hydrochloride,
3β,17α-dihydroxy-6α-chloro-4-pregnen-20-one 3-diethylaminoacetate 17-acetate hydrochloride,
3β,17α-dihydroxy-6α-trifluoromethyl-4-pregnen-20-one 3-diethylaminoacetate 17-acetate hydrochloride,
3β,17α-dihydroxy-6α-difluoromethyl-4-pregnen-20-one 3-diethylaminoacetate 17-acetate hydrochloride,
3β,17α-dihydroxy-6α-fluoromethyl-4-pregnen-20-one 3-diethylaminoacetate 17-acetate hydrochloride,
3β,17α-dihydroxy-16-methylene-4-pregnen-20-one 3-diethylaminoacetate 17-acetate hydrochloride,
3β,17α-dihydroxy-6α-methyl-16-methylene-4-pregnen-20-one 3-diethylaminoacetate 17-acetate hydrochloride,
3β,17α-dihydroxy-6α,16α-dimethyl-4-pregnen-20-one 3-diethylaminoacetate 17-acetate hydrochloride,
3β,17α-dihydroxy-6α,16β-dimethyl-4-pregnen-20-one 3-diethylaminoacetate 17-acetate hydrochloride,
3β,17α-dihydroxy-4,6-pregnadien-20-one 3-diethylaminoacetate 17-acetate hydrochloride,
3β,17α-dihydroxy-6-methyl-4,6-pregnadien-20-one 3-diethylaminoacetate 17-acetate hydrochloride,
3β,17α-dihydroxy-6-fluoro-4,6-pregnadien-20-one 3-diethylaminoacetate 17-acetate hydrochloride,
3β,17α-dihydroxy-6-chloro-4,6-pregnadien-20-one 3-diethylaminoacetate 17-acetate hydrochloride,
3β,17α-dihydroxy-6-trifluoromethyl-4,6-pregnadien-20-one 3-diethylaminoacetate 17-acetate hydrochloride,
3β,17α-dihydroxy-6-difluoromethyl-4,6-pregnadien-20-one 3-diethylaminoacetate 17-acetate hydrochloride,
3β,17α-dihydroxy-6-fluoromethyl-4,6-pregnadien-20-one 3-diethylaminoacetate 17-acetate hydrochloride,
3β,17α-dihydroxy-16-methylene-4,6-pregnadien-20-one 3-diethylaminoacetate 17-acetate hydrochloride,
3β,17α-dihydroxy-6-methyl-16-methylene-4,6-pregnadien-20-one 3-diethylaminoacetate 17-acetate hydrochloride,
3β,17α-dihydroxy-6,16α-dimethyl-4,6-pregnadien-20-one 3-diethylaminoacetate 17-acetate hydrochloride, and
3β,17α-dihydroxy-6,16β-dimethyl-4,6-pregnadien-20-one 3-diethylaminoacetate 17-acetate hydrochloride, respectively.

Similarly, reacting the 3β,17α-dihydroxy steroid 3-aminoacetate 17-acetate starting materials with hydrochloric acid is productive of the corresponding hydrochloride salt of the 3-aminoacetates, such as, for example, the 3-dimethylaminoacetate, the 3-dipropylaminoacetate, the 3-dioctylaminoacetate, the 3-(methylethylaminoacetate), the 3-(methylpropylaminoacetate), the 3-dibenzylaminoacetate, the 3-(methylbenzylaminoacetate), the 3-pyrrolidinoacetate, the 3-piperidinoacetate, the 3-morpholinoacetate, and the like, of 3β,17α-dihydroxy-4-pregnen-20-one 17-acetate,
3β,17α-dihydroxy-6α-methyl-4-pregnen-20-one 17-acetate,
3β,17α-dihydroxy-6α-fluoro-4-pregnen-20-one 17-acetate,
3β,17α-dihydroxy-6α-chloro-4-pregnen-20-one 17-acetate,
3β,17α-dihydroxy-6α-trifluoromethyl-4-pregnen-20-one 17-acetate,
3β,17α-dihydroxy-6α-difluoromethyl-4-pregnen-20-one 17-acetate,
3β,17α-dihydroxy-6α-fluoromethyl-4-pregnen-20-one 17-acetate,
3β,17α-dihydroxy-16-methylene-4-pregnen-20-one 17-acetate,
3β,17α-dihydroxy-6α-methyl-16-methylene-4-pregnen-20-one 17-acetate,
3β,17α-dihydroxy-6α,16α-dimethyl-4-pregnen-20-one 17-acetate,
3β,17α-dihydroxy-6α,16β-dimethyl-4-pregnen-20-one 17-acetate,
3β,17α-dihydroxy-4,6-pregnadien-20-one 17-acetate,
3β,17α-dihydroxy-6-methyl-4,6-pregnadien-20-one 17-acetate,
3β,17α-dihydroxy-6-fluoro-4,6-pregnadien-20-one 17-acetate,
3β,17α-dihydroxy-6-chloro-4,6-pregnadien-20-one 17-acetate,
3β,17α-dihydroxy-6-trifluoromethyl-4,6-pregnadien-20-one 17-acetate,
3β,17α-dihydroxy-6-difluoromethyl-4,6-pregnadien-20-one 17-acetate,
3β,17α-dihydroxy-6-fluoromethyl-4,6-pregnadien-20-one 17-acetate,
3β,17α-dihydroxy-16-methylene-4,6-pregnadien-20-one 17-acetate,
3β,17α-dihydroxy-6-methyl-16-methylene-4,6-pregnadien-20-one 17-acetate,
3β,17α-dihydroxy-6,16α-dimethyl-4,6-pregnadien-20-one 17-acetate, and
3β,17α-dihydroxy-6,16β-dimethyl-4,6-pregnadien-20-one 17-acetate.

Likewise, substituting a stoichiometric equivalent amount of the appropriate pharmacologically acceptable acid, such as, for example, formic, acetic, propionic, hydrobromic, hydriodic, sulfonic, phosphoric, nitric, lactic, pamoic, and the like, for hydrochloric acid, is productive of the corresponding formate, acetate, propionate, hydrobromide, hydriodide, sulfate, phosphate, nitrate, lactate, pamoate, and the like, of the 3-aminoacetate steroids of this example, Example 5.

EXAMPLE 6

*3β,17α-dihydroxy-4-pregnen-20-one 3-diethylaminoacetate 17-acetate methobromide (VII)*

500 mg. of 3β,17α-dihydroxy-4-pregnen-20-one 3-diethylaminoacetate 17-acetate is dissolved in 5 ml. of cold benzene. The solution is chilled and to it is added 0.5 ml. of methylbromide. The flask is sealed and maintained at room temperature for 72 hours. The resulting reaction mixture is concentrated to a small volume and diluted with ether. There is thus precipitated 3β,17α-dihydroxy-4-pregnen-20-one 3-diethylaminoacetate 17-acetate methobromide.

In like manner, substituting a stoichiometric equivalent amount of

3β,17α-dihydroxy-6α-methyl-4-pregnen-20-one 3-diethylaminoacetate 17-acetate,
3β,17α-dihydroxy-6α-fluoro-4-pregnen-20-one 3-diethylaminoacetate 17-acetate,
3β,17α-dihydroxy-6α-chloro-4-pregnen-20-one 3-diethylaminoacetate 17-acetate,
3β,17α-dihydroxy-6α-trifluoromethyl-4-pregnen-20-one 3-diethylaminoacetate 17-acetate,
3β,17α-dihydroxy-6α-difluoromethyl-4-pregnen-20-one 3-diethylaminoacetate 17-acetate,
3β,17α-dihydroxy-6α-fluoromethyl-4-pregnen-20-one 3-diethylaminoacetate 17-acetate,
3β,17α-dihydroxy-16-methylene-4-pregnen-20-one 3-diethylaminoacetate 17-acetate, 3β,17α-dihydroxy-6α-methyl-16-methylene-4-pregnen-20-one 3-diethylaminoacetate 17-acetate,
3β,17α-dihydroxy-6α,16α-dimethyl-4-pregnen-20-one 3-diethylaminoacetate 17-acetate,
3β,17α-dihydroxy-6α,16β-dimethyl-4-pregnen-20-one 3-diethylaminoacetate 17-acetate,
3β,17α-dihydroxy-4,6-pregnadien-20-one 3-diethylaminoacetate 17-acetate,
3β,17α-dihydroxy-6-methyl-4,6-pregnadien-20-one 3-diethylaminoacetate 17-acetate,
3β,17α-dihydroxy-6-fluoro-4,6-pregnadien-20-one 3-diethylaminoacetate 17-acetate,
3β,17α-dihydroxy-6-chloro-4,6-pregnadien-20-one 3-diethylaminoacetate 17-acetate,
3β,17α-dihydroxy-6-trifluoromethyl-4,6-pregnadien-20-one 3-diethylaminoacetate 17-acetate,
3β,17α-dihydroxy-6-difluoromethyl-4,6-pregnadien-20-one 3-diethylaminoacetate 17-acetate,
3β,17α-dihydroxy-6-fluoromethyl-4,6-pregnadien-20-one 3-diethylaminoacetate 17-acetate,
3β,17α-dihydroxy-16-methylene-4,6-pregnadien-20-one 3-diethylaminoacetate 17-acetate,
3β,17α-dihydroxy-6-methyl-16-methylene-4,6-pregnadien-20-one 3-diethylaminoacetate 17-acetate,
3β,17α-dihydroxy-6,16α-dimethyl-4,6-pregnadien-20-one 3-diethylaminoacetate 17-acetate, and
3β,17α-dihydroxy-6,16β-dimethyl-4,6-pregnadien-20-one 3-diethylaminoacetate 17-acetate, for 3β,17α-dihydroxy-4-pregnen-20-one 3-diethylaminoacetate 17-acetate is productive of 3β,17α-dihyroxy-6α-methyl-4-pregnen-20-one 3-diethylaminoacetate 17-acetate methobromide,
3β,17α-dihydroxy-6α-fluoro-4-pregnen-20-one 3-diethylaminoacetate 17-acetate methobromide,
3β,17α-dihydroxy-6α-chloro-4-pregnen-20-one 3-diethylaminoacetate 17-acetate methobromide,
3β,17α-dihydroxy-6α-trifluoromethyl-4-pregnen-20-one 3-diethylaminoacetate 17-acetate methobromide,
3β,17α-dihydroxy-6α-difluoromethyl-4-pregnen-20-one 3-diethylaminoacetate 17-acetate methobromide,
3β,17α-dihydroxy-6α-fluoromethyl-4-pregnen-20-one 3-diethylaminoacetate 17-acetate methobromide,
3β,17α-dihydroxy-16-methylene-4-pregnen-20-one 3-diethylaminoacetate 17-acetate methobromide,
3β,17α-dihydroxy-6α-methyl-16-methylene-4-pregnen-20-one 3-diethylaminoacetate 17-acetate methobromide,
3β,17α-dihydroxy-6α,16α-dimethyl-4-pregnen-20-one 3-diethylaminoacetate 17-acetate methobromide,
3β,17α-dihydroxy-6α,16β-dimethyl-4-pregnen-20-one 3-diethylaminoacetate 17-acetate methobromide,
3β,17α-dihydroxy-4,6-pregnadien-20-one 3-diethylaminoacetate 17-acetate methobromide,
3β,17α-dihydroxy-6-methyl-4,6-pregnadien-20-one 3-diethylaminoacetate 17-acetate methobromide,
3β,17α-dihydroxy-6-fluoro-4,6-pregnadien-20-one 3-diethylaminoacetate 17-acetate methobromide,
3β,17α-dihydroxy-6-chloro-4,6-pregnadien-20-one 3-diethylaminoacetate 17-acetate methobromide,
3β,17α-dihydroxy-6-trifluoromethyl-4,6-pregnadien-20-one 3-diethylaminoacetate 17-acetate methobromide,
3β,17α-dihydroxy-6-difluoromethyl-4,6-pregnadien-20-one 3-diethylaminoacetate 17-acetate methobromide,
3β,17α-dihydroxy-6-fluoromethyl-4,6-pregnadien-20-one 3-diethylaminoacetate 17-acetate methobromide,
3β,17α-dihydroxy-16-methylene-4,6-pregnadien-20-one 3-diethylaminoacetate 17-acetate methobromide,
3β,17α-dihydroxy-6-methyl-16-methylene-4,6-pregnadien-20-one 3-diethylaminoacetate 17-acetate methobromide,
3β,17α-dihydroxy-6,16α-dimethyl-4,6-pregnadien-20-one 3-diethylaminoacetate 17-acetate methobromide, and
3β,17α-dihydroxy-6,16β-dimethyl-4,6-pregnadien-20-one 3-diethylaminoacetate 17-acetate methobromide, respectively.

Similarly, reacting the 3β,17α-dihydroxy steroid 3-aminoacetate 17-acetate starting materials with methylbromide is productive of the corresponding methobromide quaternary ammonium salt of the 3-aminoacetates, such as, for example, the 3-dimethylaminoacetate, the 3-dipropylaminoacetate, the 3-dioctylaminoacetate, the 3-(methylethylaminoacetate), the 3-(methylpropylaminoacetate), the 3-dibenzylaminoacetate, the 3-(methylbenzylaminoacetate), the 3-pyrrolidinoacetate, the 3-piperidinoacetate, the 3-morpholinoacetate, and the like, of 3β,17α-dihydroxy-4-pregnen-20-one 17-acetate,
3β,17α-dihydroxy-6α-methyl-4-pregnen-20-one 17-acetate,
3β,17α-dihydroxy-6α-fluoro-4-pregnen-20-one 17-acetate,
3β,17α-dihydroxy-6α-chloro-4-pregnen-20-one 17-acetate,
3β,17α-dihydroxy-6α-trifluoromethyl-4-pregnen-20-one 17-acetate,
3β,17α-dihydroxy-6α-difluoromethyl-4-pregnen-20-one 17-acetate,
3β,17α-dihydroxy-6α-fluoromethyl-4-pregnen-20-one 17-acetate,
3β,17α-dihydroxy-16-methylene-4-pregnen-20-one 17-acetate,
3β,17α-dihydroxy-6α-methyl-16-methylene-4-pregnen-20-one 17-acetate,
3β,17α-dihydroxy-6α,16α-dimethyl-4-pregnen-20-one 17-acetate,
3β,17α-dihydroxy-6α,16β-dimethyl-4-pregnen-20-one 17-acetate,
3β,17α-dihydroxy-4,6-pregnadien-20-one 17-acetate,
3β,17α-dihydroxy-6-methyl-4,6-pregnadien-20-one 17-acetate,
3β,17α-dihydroxy-6-fluoro-4,6-pregnadien-20-one 17-acetate,
3β,17α-dihydroxy-6-chloro-4,6-pregnadien-20-one 17-acetate,
3β,17α-dihydroxy-6-trifluoromethyl-4,6-pregnadien-20-one 17-acetate,
3β,17α-dihydroxy-6-difluoromethyl-4,6-pregnadien-20-one 17-acetate,
3β,17α-dihydroxy-6-fluoromethyl-4,6-pregnadien-20-one 17-acetate,
3β,17α-dihydroxy-16-methylene-4,6-pregnadien-20-one 17-acetate,
3β,17α-dihydroxy-6-methyl-16-methylene-4,6-pregnadien-20-one 17-acetate,
3β,17α-dihydroxy-6,16α-dimethyl-4,6-pregnadien-20-one 17-acetate, and
3β,17α-dihydroxy-6,16β-dimethyl-4,6-pregnadien-20-one 17-acetate.

Likewise, substituting a stoichiometric equivalent amount of methyl chloride or methyl iodide for methyl bromide is productive of the corresponding methochloride or methiodide of the quaternary ammonium salt of the 3-aminoacetates of this example, Example 6.

EXAMPLE 7

*3β,17α-dihydroxy-4-pregnen-20-one 3-pyridiniumacetate 17-acetate chloride (VII)*

1 g. of 3β,17α-dihydroxy-4-pregnen-20-one 3-chloroacetate 17-acetate is dissolved in 15 ml. of dry tetrahydrofuran and to the solution is added one molar equivalent of pyridine in 15 ml. of dry tetrahydrofuran. The reaction mixture is stirred for 24 hours at room temperature and then filtered. The filtrate is concentrated to dryness at reduced pressure to yield 3β,17α-dihydroxy-4-pregnen-20-one 3-pyridiniumacetate 17-acetate chloride.

In like manner, substituting a stoichiometric equivalent amount of

3β,17α-dihydroxy-6α-methyl-4-pregnen-20-one 3-chloroacetate 17-acetate,
3β,17α-dihydroxy-6α-fluoro-4-pregnen-20-one 3-chloroacetate 17-acetate, 3β,17α-dihydroxy-6α-chloro-4-pregnen-20-one 3-chloroacetate 17-acetate,
3β,17α-dihydroxy-6α-trifluoromethyl-4-pregnen-20-one 3-chloroacetate 17-acetate,
3β,17α-dihydroxy-6α-difluoromethyl-4-pregnen-20-one 3-chloroacetate 17-acetate,
3β,17α-dihydroxy-6α-fluoromethyl-4-pregnen-20-one 3-chloroacetate 17-acetate,
3β,17α-dihydroxy-16-methylene-4-pregnen-20-one 3-chloroacetate 17-acetate,
3β,17α-dihydroxy-6α-methyl-16-methylene-4-pregnen-20-one 3-chloroacetate 17-acetate,
3β,17α-dihydroxy-6α,16α-dimethyl-4-pregnen-20-one 3-chloroacetate 17-acetate,
3β,17α-dihydroxy-6α,16β-dimethyl-4-pregnen-20-one 3-chloroacetate 17-acetate,
3α,17β-dihydroxy-4,6-pregnadien-20-one 3-chloroacetate 17-acetate,
3β,17α-dihydroxy-6-methyl-4,6-pregnadien-20-one 3-chloroacetate 17-acetate,
3β,17α-dihydroxy-6-fluoro-4,6-pregnadien-20-one 3-chloroacetate 17-acetate,
3β,17α-dihydroxy-6-chloro-4,6-pregnadien-20-one 3-chloroacetate 17-acetate,
3β,17α-dihydroxy-6-trifluoromethyl-4,6-pregnadien-20-one 3-chloroacetate 17-acetate,
3β,17α-dihydroxy-6-difluoromethyl-4,6-pregnadien-20-one 3-chloroacetate 17-acetate,
3β,17α-dihydroxy-6-fluoromethyl-4,6-pregnadien-20-one 3-chloroacetate 17-acetate,
3β,17α-dihydroxy-16-methylene-4,6-pregnadien-20-one 3-chloroacetate 17-acetate,
3β,17α-dihydroxy-6-methyl-16-methylene-4,6-pregnadien-20-one 3-chloroacetate 17-acetate,
3β,17α-dihydroxy-6,16α-dimethyl-4,6-pregnadien-20-one 3-chloroacetate 17-acetate, and
3β,17α-dihydroxy-6,16β-dimethyl-4,6-pregnadien-20-one 3-chloroacetate 17-acetate, for 3β,17α-dihydroxy-4-pregnen-20-one 3-chloroacetate 17-acetate is productive of 3β,17α-dihydroxy-6α-methyl-4-pregnen-20-one 3-pyridiniumacetate 17-acetate chloride,
3β,17α-dihydroxy-6α-fluoro-4-pregnen-20-one 3-pyridiniumacetate 17-acetate chloride,
3β,17α-dihydroxy-6α-chloro-4-pregnen-20-one 3-pyridiniumacetate 17-acetate chloride,
3β,17α-dihydroxy-6α-trifluoromethyl-4-pregnen-20-one 3-pyridiniumacetate 17-acetate chloride,
3β,17α-dihydroxy-6α-difluoromethyl-4-pregnen-20-one 3-pyridiniumacetate 17-acetate chloride,
3β,17α-dihydroxy-6α-fluoromethyl-4-pregnen-20-one 3-pyridiniumacetate 17-acetate chloride,
3β,17α-dihydroxy-16-methylene-4-pregnen-20-one 3-pyridiniumacetate 17-acetate chloride,
3β,17α-dihydroxy-6α-methyl-16-methylene-4-pregnen-20-one 3-pyridiniumacetate 17-acetate chloride,
3β,17α-dihydroxy-6α,16α-dimethyl-4-pregnen-20-one 3-pyridiniumacetate 17-acetate chloride,
3β,17α-dihydroxy-6α,16β-dimethyl-4-pregnen-20-one 3-pyridiniumacetate 17-acetate chloride,
3β,17α-dihydroxy-4,6-pregnadien-20-one 3-pyridinumacetate 17-acetate chloride,
3β,17α-dihydroxy-6-methyl-4,6-pregnadien-20-one 3-pyridiniumacetate 17-acetate chloride,
3β,17α-dihydroxy-6-fluoro-4,6-pregnadien-20-one 3-pyridiniumacetate 17-acetate chloride,
3β,17α-dihydroxy-6-chloro-4,6-pregnadien-20-one 3-pyridiniumacetate 17-acetate chloride,
3β,17α-dihydroxy-6-trifluoromethyl-4,6-pregnadien-20-one 3-pyridiniumacetate 17-acetate chloride,
3β,17α-dihydroxy-6-difluoromethyl-4,6-pregnadien-20-one 3-pyridiniumacetate 17-acetate chloride,
3β,17α-dihydroxy-6-fluoromethyl-4,6-pregnadien-20-one 3-pyridiniumacetate 17-acetate chloride,
3β,17α-dihydroxy-16-methylene-4,6-pregnadien-20-one 3-pyridiniumacetate 17-acetate chloride,
3β,17α-dihydroxy-6-methyl-16-methylene-4,6-pregnadien-20-one 3-pyridiniumacetate 17-acetate chloride,
3β,17α-dihydroxy-6,16α-dimethyl-4,6-pregnadien-20-one 3-pyridiniumacetate 17-acetate chloride, and
3β,17α-dihydroxy-6,16β-dimethyl-4,6-pregnadien-20-one 3-pyridiniumacetate 17-acetate chloride, respectively.

Similarly, substituting a stoichiometric equivalent amount of the 3-bromoacetate of the 3β,17α-dihydroxy steroid 17-acetates for the 3-chloroacetates given above is productive of the corresponding 3β,17α-dihydroxy 3-pyridiniumacetate 17-acetate bromides.

The 3-pyridinium bromides and chlorides of this example have the same uses and are administered in the same manner as the quaternary ammonium salts of the 3-aminoacetates described above.

EXAMPLE 8

*3β,17α-dihydroxy-6α-methyl-4-pregnen-20-one 3-hemisuccinate 17-acetate (II)*

To a solution of 2.5 g. of 3β,17α-dihydroxy-6α-methyl-4-pregnen-20-one 17-acetate in 25 ml. of pyridine there was added 2.5 g. of succinic anhydride. The reaction mixture was kept at room temperature for about 16 hours and then heated at 60°–70° C. for about 12 hours. The succinate ester appeared as the only spot near the origin when a small amount of the reaction mixture was subjected to thin layer chromatography. The reaction mixture was poured into ice water containing 30 ml. of concentrated hydrochloric acid. The precipitate which formed was collected, washed well with water, dried, slurried with 100 ml. of water and a small amount of detergent (to held wet the precipitate), followed by the slow addition of 60 ml. of 0.1 N sodium hydroxide to effect solution of the precipitate. Filtration through a bed of Celite (diatomaceous earth) removed the small amount of insoluble matter. The filtrate obtained was reprecipitated by the dropwise addition of 3 N hydrochloric acid. The precipitate which formed during the recrystallization was collected, washed with water, and dried to yield 2.7 g. of product comprising 3β,17α-dihydroxy-6α-methyl-4-pregnen-20-one 3-hemisuccinate 17-acetate, which was used in the following example (Example 9) without further purification.

EXAMPLE 9

*3β,17α-dihydroxy-6α-methyl-4-pregnen-20-one 3-sodium succinate 17-acetate (III)*

To a solution of 1.0 g. of the product comprising 3β,17α-dihydroxy-6α-methyl-4-pregnen-20-one 3-hemisuccinate 17-acetate, obtained in Example 8, in 50 ml. of acetone there was added an equivalent amount (0.177 g.) of sodium bicarbonate in 8 ml. of water. Water was intermittently added while the acetone was removed on a rotary evaporator. Following removal of the acetone a clear solution was obtained which was diluted to about 15 ml. with water and swirled while freezing in a one liter round bottom flask. The frozen product was dried on a lyophilizer and the fluffy amorphous powder obtained was dissolved in water and filtered through a bed of Celite (diatomaceous earth) to remove the scum which had formed. The filtrate was freeze-dried again to give 1.0 g. of 3β,17α-dihydroxy-6α-methyl-4-pregnen-20-one 3-sodium succinate 17-acetate, an amorphous solid, having intense infrared absorptions at 1725 and 1245 cm.$^{-1}$. The molecular weight as determined by titration was 529 (510 theory). 3β,17α-dihydroxy-6α-methyl-4-pregnen-20-one 3-sodium succinate 17-acetate at pH 9 and 25° C. has a half life of substantially greater than one hour.

EXAMPLE 10

*3β,17α-dihydroxy-6α-methyl-4-pregnen-20-one 3-chloroacetate 17-acetate (IV)*

A slow stream of nitrogen was passed through a solution of 2.0 g. of 3β,17α - dihydroxy - 6α - methyl - 4-pregnen-20-one 17-acetate in 5 ml. of pyridine. The solution was cooled in an ice-salt bath and a solution of 1.0 g. of chloroacetic anhydride in 30 ml. of dry ether was added dropwise with stirring. After 3 hours most of the ether had been expelled by the nitrogen stream. Thin layer chromatography of a small portion of the reaction mixture showed the absence of starting material. Ten drops of water was added to destroy the excess chloroacetic anhydride. The solution was poured into ice-water and extracted with ether. The ether extracts were combined, washed with cold dilute hydrochloric acid, water, dilute cold sodium bicarbonate, and again with water, dried over sodium sulfate, followed by removal of the ether by evaporation. The residue remaining was recrystallized from ether-commercial hexanes to give 1.9 g. of 3β,17α - dihydroxy - 6α - methyl-4 - pregnen - 20 - one 3 - chloroacetate 17 - acetate having a melting point of 123°–126° C., $[\alpha]_D$ –19° (CHCl$_3$), and the following analysis:

*Analysis.*—Calcd. for $C_{26}H_{37}ClO_5$: C, 67.15; H, 8.02; Cl, 7.62. Found: C, 67.28; H, 8.18; Cl, 7.70.

EXAMPLE 11

*3β,17α-dihydroxy-6α-methyl-4-pregnen-20-one 3-diethylaminoacetate 17-acetate (V)*

A solution of 0.75 g. of 3β,17α - dihydroxy-6α-methyl-4-pregnen-20-one 3-chloroacetate 17-acetate in 10 ml. of tetrahydrofuran and 2 ml. of diethylamine was heated at 60°–65° C. in a sealed tube for two hours and then at 50° C. for 18 hours. The solution was cooled and the crystals of diethylamine hydrochloride were removed by filtration. The filtrate was then concentrated to dryness (to remove traces of diethylamine) and the residue was dissolved in ether. The ether was removed by evaporation to yield an amorphous residue of 3β,17α-dihydroxy-6α - methyl - 4 - pregnen - 20 - one 3 - diethylaminoacetate 17-acetate which was dried under vacuum and used in the following example (Example 12) without further purification.

EXAMPLE 12

*3β,17α-dihydroxy-6α-methyl-4-pregnen-20-one 3-diethylaminoacetate 17-acetate hydrochloride (VI)*

The amorphous residue of 3β,17α - dihydroxy - 6α-methyl - 4 - pregnen - 20 - one 3 - diethylaminoacetate 17-acetate, obtained in Example 11, was dissolved in 30 ml. of absolute ether and 4.5 ml. of a freshly prepared 0.39 N etheral hydrogen chloride solution was added dropwise. The precipitated amorphous solid was filtered, washed with ether and dried to yield 0.8 g. of 3β,17α-dihydroxy - 6α - methyl - 4 - pregnen-20-one 3-diethylaminoacetate 17-acetate hydrochloride having infrared absorption bands at 2700, 2510, 2440, 1745, 1735, 1700, 1660, 1245 and 1210 cm.$^{-1}$ and the following analysis:

*Analysis.*—Calcd. for $C_{30}H_{48}O_5NCl$: C, 66.95; H, 8.99; N, 2.60; Cl, 6.59. Found: C, 66.93; H, 9.18; N, 2.59; Cl, 6.74.

EXAMPLE 13

*Intravenous preparation*

A batch of 3β,17α - dihydroxy - 6α - methyl-4-pregnen-20-one 3-sodium succinate 17-acetate powder is sterilized with ethylene oxide gas and then 100 mg. quantities are transferred aseptically into sterile five cubic centimeter ampuls which are then sealed.

For emergency use in threatened abortion, sterile sodium chloride injection solution is added to dissolve the 100 mg. of powder and enough vehicle used to make 2 ml. of solution. This solution is then administered intravenously or intramuscularly.

Similarly, the other steroids produced as products in Examples 2, 5, 6, 7 and 12 can be substituted for the active ingredient of the formulation of Example 13.

EXAMPLE 14

*Tablets*

Ten thousand scored tablets for oral use, each containing 5 mg. of 3β,17α - dihydroxy-6α-methyl-16-methylene-4-pregnen-20-one 3-diethylaminoacetate 17-acetate hydrochloride, are prepared from the following ingredients:

| | Gm. |
|---|---|
| 3β,17α - dihydroxy - 6α - methyl - 16 - methylene-4 - pregnen - 20 - one 3 - diethylaminoacetate 17-acetate hydrochloride | 50 |
| Lactose | 2000 |
| Corn starch | 300 |
| Talc | 300 |
| Calcium stearate | 40 |

The powdered ingredients are thoroughly mixed and slugged. The slugs are broken down into granules which are then compressed into tablets containing 5 mg. of drug. For functional uterine bleeding 1 tablet is taken three to four times a day.

Similarly, the other steroids produced as products in Examples 1, 2, 4, 5, 6, 7, 8, 9, 11 and 12 can be substituted for the active ingredient of the tablet of Example 14.

We claim:

1. A compound selected from the group consisting of
(a) Those having the formulae:

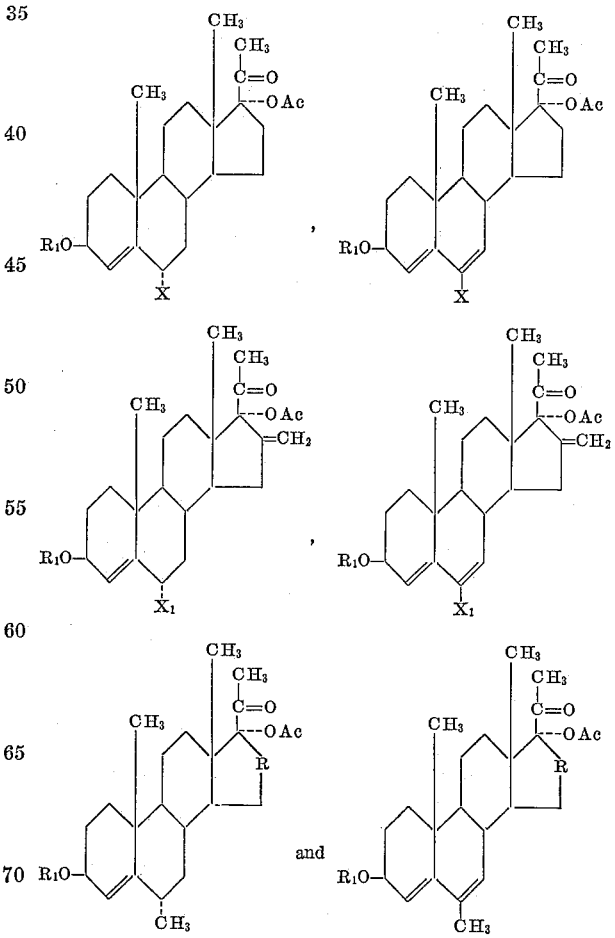

and wherein Ac is the acetyl radical, X is selected from the group consisting of hydrogen, fluoro, chloro, trifluoromethyl, difluoromethyl, and fluoromethyl, $X_1$ is selected from the group consisting of hydrogen and methyl, R is selected from the group consisting of

and

and $R_1$ is selected from the group consisting of (i) The acyl radical of a hydrocarbon dicarboxylic acid containing from 3 to 12 carbon atoms, inclusive, and (ii) An aminosubstituted acetyl radical of the formula

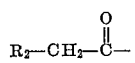

wherein $R_2$ is selected from the group consisting of the pyrrolidino, piperidino and morpholino radicals and a radical of the formula

wherein $R_3$ and $R_4$ are selected from the group consisting of the benzyl radical and lower alkyl radicals containing from 1 to 4 carbon atoms, inclusive;

(b) The alkali metal salts of (a) (i); and (c) The pharmacologically acceptable acid addition and quaternary ammonium salts of (a) (ii).

2. 3β,17α - dihydroxy - 6α - methyl - 16 - methylene-4-pregnen-20-one 3-hemisuccinate 17-acetate.

3. 3β,17α - dihydroxy - 6 - methyl - 16 - methylene-4,6-pregnadien-20-one 3-hemisuccinate 17-acetate.

4. 3β,17α - dihydroxy - 6α,16α - dimethyl - 4 - pregnen-20-one 3-hemisuccinate 17-acetate.

5. 3β,17α - dihydroxy - 6,16α - dimethyl - 4,6 - pregnadien-20-one 3-hemisuccinate 17-acetate.

6. 3β,17α - dihydroxy - 6 - chloro - 4,6 - pregnadien-20-one 3-hemisuccinate 17-acetate.

7. 3β,17α - dihydroxy - 6α - fluoro - 4 - pregnen-20-one 3-hemisuccinate 17-acetate.

8. 3β,17α - dihydroxy - 6α - chloro-4-pregnen-20-one 3-hemisuccinate 17-acetate.

9. 3β,17α - dihydroxy - 4 - pregnen-20-one 3-hemisuccinate 17-acetate.

10. 3β,17α - dihydroxy - 6 methyl - 16 - methylene-4,6-pregnadien-20-one 3 - hemi - β,β - dimethylglutarate 17-acetate.

11. 3β,17α - dihydroxy - 6 - methyl-16-methylene-4,6-pregnadien-20-one 3-diethylaminoacetate 17-acetate.

12. A compound selected from the group consisting of
3β,17α-dihydroxy-6α-methyl-16-methylene-4-pregnen-20-one 3-sodium succinate 17-acetate,
3β,17α-dihydroxy-6-methyl-16-methylene-4,6-pregnadien-20-one 3-sodium succinate 17-acetate,
3β,17α-dihydroxy-6α,16α-dimethyl-4-pregnen-20-one 3-sodium succinate 17-acetate,
3β,17α-dihydroxy-6,16α-dimethyl-4,6-pregnadien-20-one 3-sodium succinate 17-acetate,
3β,17α-dihydroxy-6-chloro-4,6-pregnadien-20-one 3-sodium succinate 17-acetate,
3β,17α-dihydroxy-6α-fluoro-4-pregnen-20-one 3-sodium succinate 17-acetate,
3β,17α-dihydroxy-6α-chloro-4-pregnen-20-one 3-sodium succinate 17-acetate,
3β,17α-dihydroxy-4-pregnen-20-one 3-sodium succinate 17-acetate, and
3β,17α-dihydroxy-6-methyl-16-methylene-4,6-pregnadien-20-one 3-sodium-β,β-dimethylglutarate 17-acetate.

13. 3β,17α - dihydroxy - 6α - methyl - 4 - pregnen-20-one 3-diethylaminoacetate 17-acetate hydrochloride.

14. The 3-hemidiglycolate of a compound selected from the group consisting of those having the formulae:

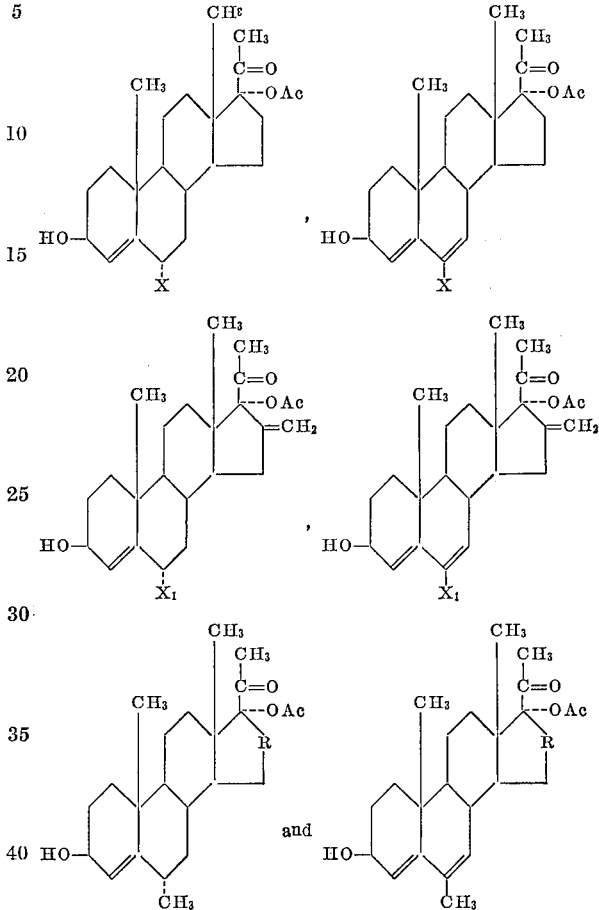

wherein Ac is the acetyl radical, X is selected from the group consisting of hydrogen, fluoro, chloro, trifluoromethyl, difluoromethyl, and fluoromethyl $X_1$ is selected from the group consisting of hydrogen and methyl and R is selected from the group consisting of

and

15. The 3-pyridiniumacetate halide, wherein the halide is selected from the group consisting of chloride and bromide, of a compound selected from the group consisting of those having the formulae:

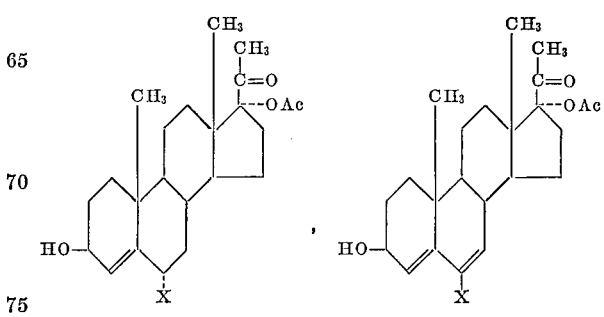

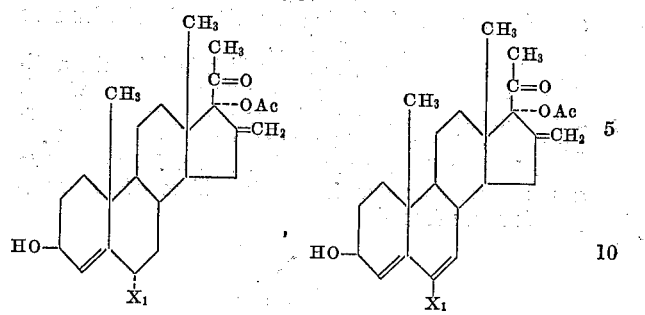
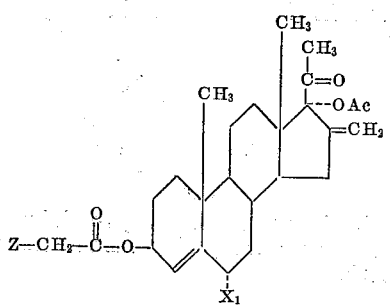

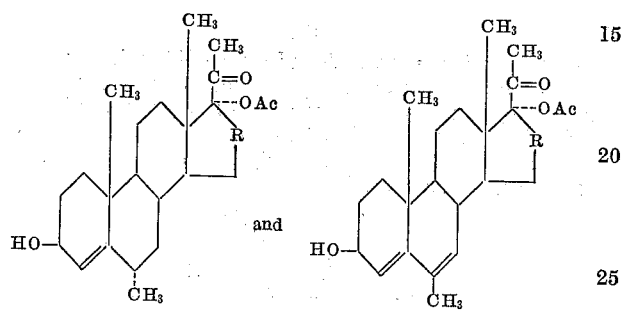
and wherein Ac is the acetyl radical, X is selected from the group consisting of hydrogen, methyl, fluoro, chloro, trifluoromethyl, difluoromethyl, and fluoromethyl, $X_1$ is selected from the group consisting of hydrogen and methyl and R is selected from the group consisting of

and

16. A compound selected from the group consisting of those having the formulae:

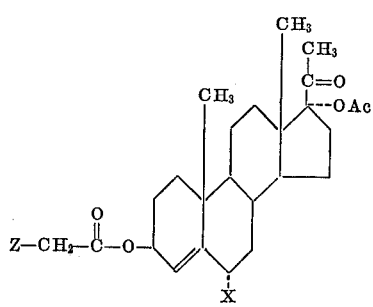

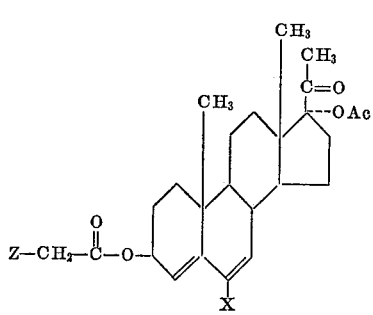

and

wherein Ac is the acetyl radical, X is selected from the group consisting of hydrogen, methyl, fluoro, chloro, trifluoromethyl, difluoromethyl, and fluoromethyl, $X_1$ is selected from the group consisting of hydrogen and methyl, R is selected from the group consisting of and Z is selected from the group consisting of chlorine and bromine.

17. 3β,17α-dihydroxy-6α-methyl-4-pregnen-20-one 3-chloroacetate 17-acetate.

18. Process for the production of a compound of the formula

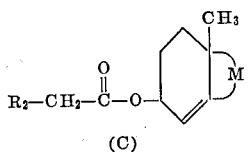

(C)

wherein $R_2$ is selected from the group consisting of pyrrolidino, piperidino and morpholino radicals and a radical of the formula

wherein $R_3$ and $R_4$ are selected from the group consisting of the benzyl radical and lower alkyl radicals containing from 1 to 4 carbon atoms, inclusive, and M is the remainder of the steroid moiety, which comprises reacting a compound of the formula

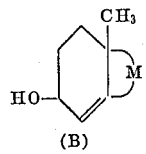

(B)

wherein M is defined as above, with a haloacetylating agent selected from the group consisting of bromoacetic anhydride, bromoacetyl chloride, chloroacetic anhydride and chloroacetyl chloride, to obtain a compound of the formula

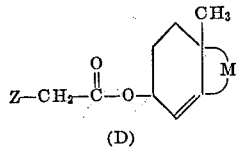

(D)

wherein M is defined as above, and Z is selected from the group consisting of chloro and bromo and reacting the latter with a secondary amine to obtain the compounds of Formula C.

19. The process of claim 18 which includes the additional step of reacting the compounds of Formula C with a pharmacologically acceptable acid to obtain the corresponding pharmacologically acceptable acid addition salts of the compounds of Formula C.

20. The process of claim 19 which includes the additional step of reacting the compounds of Formula C with a lower-alkyl halide to obtain the corresponding quaternary ammonium salts of the compounds of Formula C.

21. Process for the production of the 3-aminoacetate quaternary ammonium halide derivatives of the compounds of the formula

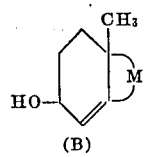

(B)

wherein M is the remainder of the steroid moiety, which comprises reacting the compounds of Formula B with a haloacetylating agent selected from the group consisting of bromoacetic anhydride, bromoacetyl chloride, chloroacetic anhydride and chloroacetyl chloride, to obtain a compound of the formula

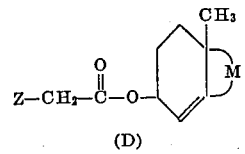

(D)

wherein M is defined as above and Z is selected from the group consisting of chloro and bromo, and reacting the compounds of Formula D with a tertiary amine to yield the corresponding 3-aminoacetate quaternary ammonium halides corresponding to Formula B.

References Cited by the Examiner

UNITED STATES PATENTS

| | | | |
|---|---|---|---|
| 2,871,160 | 1/59 | Johnson et al. | 167—77 |
| 2,883,401 | 4/59 | Babcock et al. | 260—397.45 |
| 3,029,260 | 4/62 | Mihina | 260—397.4 |
| 3,086,011 | 4/63 | Hull | 260—239.5 |
| 3,126,399 | 3/64 | Sollman | 260—397.4 |
| 3,157,679 | 11/64 | Bork | 260—397.4 |

LEWIS GOTTS, *Primary Examiner.*